US012800898B2

(12) United States Patent
Mizusawa

(10) Patent No.: US 12,800,898 B2
(45) Date of Patent: Nov. 17, 2026

(54) MICROSCOPE OBJECTIVE LENS

(71) Applicant: Changzhou AAC Raytech Optronics Co., Ltd., Changzhou City (CN)

(72) Inventor: Masayuki Mizusawa, Osaka (JP)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 179 days.

(21) Appl. No.: 19/000,620

(22) Filed: Dec. 23, 2024

(65) Prior Publication Data

US 2026/0009990 A1 Jan. 8, 2026

Related U.S. Application Data

(63) Continuation of application No. PCT/CN2024/103653, filed on Jul. 4, 2024.

(51) Int. Cl.
*G02B 21/02* (2006.01)
*G02B 7/02* (2021.01)
*G02B 9/64* (2006.01)

(52) U.S. Cl.
CPC ............. *G02B 21/02* (2013.01); *G02B 7/025* (2013.01); *G02B 9/64* (2013.01)

(58) Field of Classification Search
CPC ..................................................... G02B 21/02
USPC ......................................................... 359/656
See application file for complete search history.

(56) References Cited

U.S. PATENT DOCUMENTS

2002/0027707 A1* 3/2002 Ono ....................... G02B 21/16 359/368
2004/0201900 A1* 10/2004 Kurata ................... G02B 21/02 359/660
2006/0126048 A1* 6/2006 Sumiyoshi .......... G03F 7/70241 355/53
2015/0146304 A1* 5/2015 Yamawaki ............. G02B 21/02 359/656
2016/0116724 A1* 4/2016 Abe ....................... G02B 21/33 359/656
2017/0010454 A1* 1/2017 Abe ....................... G02B 21/02
2018/0356622 A1* 12/2018 Konishi ............... G02B 21/025
2024/0045192 A1* 2/2024 Takagi .................. G02B 21/00

* cited by examiner

*Primary Examiner* — Darryl J Collins
(74) *Attorney, Agent, or Firm* — Wiersch Law Group

(57) ABSTRACT

Disclosed is a microscope objective lens, whose focal length is f, total optical length is TTL, image height is IH. A combined focal length of the first and second lenses is f1_2, a focal length of the third lens is f3, a combined focal length of the fourteenth, fifteenth and sixteenth lenses is f14_15_16, a combined focal length of the seventeenth and eighteenth lenses is f17_18, an on-axis thickness of the seventeenth lens is d33, an on-axis thickness of the eighteenth lens is d35, and the microscope objective lens satisfies following relationships: $-3.10 \leq f1\_2/f3 \leq -1.80$; $3.40 \leq f14\_15\_16/f \leq 7.00$; $4.00 \leq f17\_18/(d33+d35) \leq 120.00$; and $0.08 \leq IH*f/TTL \leq 0.09$. The microscope objective lens has a compact structure and excellent optical performance, meeting design requirements of low distortion, 20 times magnification, and long working distance.

27 Claims, 9 Drawing Sheets

MICROSCOPE OBJECTIVE LENS

CROSS REFERENCE TO RELATED APPLICATIONS

The present application is a continuation of PCT Patent Application No. PCT/CN2024/103653, entitled "MICROSCOPE OBJECTIVE LENS," filed Jul. 4, 2024, which is incorporated herein by reference in its entirety.

TECHNICAL FIELD

Embodiments of the present disclosure relate to the technical field of poetics, and in particular to an objective lens suitable for devices such as microscopes.

BACKGROUND

In recent years, the demand for microscope lenses has been increasing, but ordinary microscope lenses will have distortion within their microscopic range due to the constraints of their optical structure. In addition, microscope lenses are composed of multiple lenses and then its length will inevitably be affected. The long structure of the microscope lens will also shorten its working distance, and the magnification will also be affected by the working distance, which is not conducive to the use of operators.

With the development of technology and the increase in diversified user demands, scientific research has continuously increased the requirements for microscope observation quality, and therefore there is an urgent need for microscope lenses with excellent optical properties, low distortion, high magnification, and long working distance.

SUMMARY

The embodiments of the present disclosure provide a microscope objective lens, which has a large numerical aperture, a compact lens structure, and good optical performance.

In order to solve the above technical problems, the embodiments of the present disclosure provide a microscope objective lens. The microscope objective lens includes a first lens, a second lens, a third lens having negative refractive power, a fourth lens, a fifth lens, a sixth lens, a seventh lens having positive refractive power, an eighth lens, a ninth lens, a tenth lens having positive refractive power, an eleventh lens, a twelfth lens, a thirteenth lens having positive refractive power, a fourteenth lens, a fifteenth lens, a sixteenth lens, a seventeenth lens, and an eighteenth lens, which are arranged in sequence from an exit side to an object side. The microscope objective lens satisfies following relationships: $-3.10 \leq f1\_2/f3 \leq -1.80$; $3.40 \leq f14\_15\_16/f \leq 7.00$; $4.00 \leq f17\_18/(d33+d35) \leq 120.00$; $0.08 \leq IH*f/TTL \leq 0.09$. Where, f represents a focal length of the microscope objective lens, f1_2 represents a combined focal length of the first lens and the second lens, f3 represents a focal length of the third lens, f14_15_16 represents a combined focal length of the fourteenth lens, the fifteenth lens and the sixteenth lens, f17_18 represents a combined focal length of the seventeenth lens and the eighteenth lens, d33 represents an on-axis thickness of the seventeenth lens, d35 represents an on-axis thickness of the eighteenth lens, TTL represents an on-axis distance from an object surface of the microscope objective lens to an exit surface of the first lens, IH represents an image height of the microscope objective lens.

The beneficial effects of the embodiments of the present disclosure are as follows. Through the arrangement of the lenses, the trend of light between lenses can be controlled, which helps to smoothly transition the outgoing light. The lens structure is compact, and the total length of the lens is controlled while ensuring that the imaging range reaches the expected state. The microscope objective lens has a large numerical aperture to ensure that the light has sufficient convergence and has excellent optical performance, meeting the design requirements of low distortion, 20 times magnification, and long working distance.

BRIEF DESCRIPTION OF THE DRAWINGS

One or more embodiments are illustrated by the figures in the corresponding drawings, and these exemplified descriptions do not constitute limitations on the embodiments. Elements with the same reference numerals in the drawings represent similar elements, and the diagrams in the drawings do not constitute proportional limitations unless otherwise stated.

DETAILED DESCRIPTION OF THE EMBODIMENTS

Figure 1:
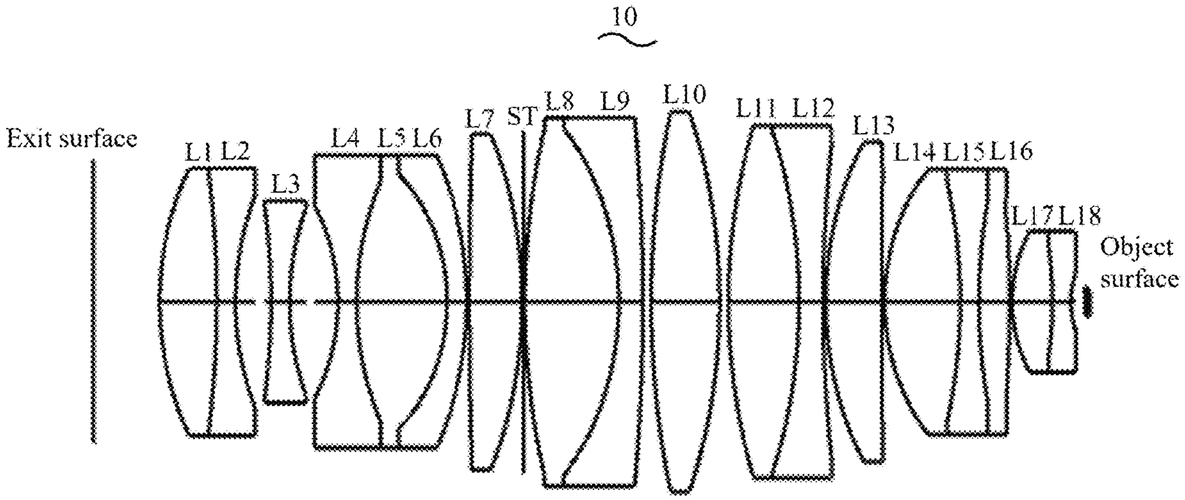
FIG. 1 is a schematic structural diagram of a microscope objective lens in a first embodiment of the present disclosure.

The following will be described in detail with reference to the accompanying drawings to illustrate the purpose, technical solutions and advantages of the embodiments of the present disclosure. However, those skilled in the art should appreciate that many technical details are proposed in the various embodiments of the present disclosure in order to enable the reader to better understand the present disclosure. However, the technical solutions claimed in the present disclosure can be implemented even without these technical details and various changes and modifications based on the following embodiments.

In the embodiments of the present disclosure, the terms "on", "below", "left", "right", "front", "back", "top", "bottom", "inner", "outer", "middle", "vertical", "horizontal", "lateral", "longitudinal" and the like indicate orientation or position relationship based on the orientation or position relationship shown in the drawings. These terms are mainly used to better describe the present disclosure and its embodiments, and are not used to limit the indicated devices, elements or components to have a specific orientation, or to be constructed and operated in a specific orientation.

In addition, some of the above terms may be used to express other meanings in addition to indicating the orientation or position relationship. For example, the term "on" may also be used to express a certain dependency or connection relationship in some cases. For those skilled in the art, the specific meanings of these terms in the present disclosure can be understood according to specific circumstances.

In addition, the terms "installed", "set", "provided with", "set up", "connected", and "linked" should be understood in a broad sense. For example, the connection may be a fixed connection, a detachable connection, an integral structure, a mechanical connection, an electrical connection, a direct connection, an indirect connection through an intermediate medium, or an internal connection between two devices, elements, or components. For those skilled in the art, the specific meanings of the above terms in this application can be understood according to specific circumstances.

It should be noted that, relational terms herein such as first and second, etc. are only used to distinguish one entity or operation from another entity or operation, and do not necessarily require or imply any such actual relationship or order between these entities or operations. Moreover, the terms "include", "comprise" or any other variants thereof are intended to cover non-exclusive inclusion, so that a process, method, article or device including a series of elements includes not only those elements, but also other elements not explicitly listed, or also includes elements inherent to such process, method, article or device. In the absence of further restrictions, the elements defined by the statement "include . . . " do not exclude the presence of other identical elements in the process, method, article or device including the elements.

Referring to FIG. 1, FIG. 5, FIG. 9, and FIG. 13, the technical solution of the present disclosure provides a microscope objective lens 10, 20, 30, and 40. The microscope objective lens 10, 20, 30, and 40 includes a first lens L1, a second lens L2, a third lens L3 having negative refractive power, a fourth lens L4, a fifth lens L5, a sixth lens L6, a seventh lens L7 having positive refractive power, an eighth lens L8, a ninth lens L9, a tenth lens L10 having positive refractive power, an eleventh lens L11, a twelfth lens L12, a thirteenth lens L13 having positive refractive power, a fourteenth lens L14, a fifteenth lens L15, a sixteenth lens L16, a seventeenth lens L17, and an eighteenth lens L18, which are sequentially arranged from the exit side to the object side.

A focal length of the microscope objective lens 10, 20, 30, and 40 is defined as f, a combined focal length of the first lens L1 and the second lens L2 is defined as f1_2, the focal length of the third lens L3 is defined as f3, the combined focal length of the fourteenth lens L14, the fifteenth lens L15, and the sixteenth lens L16 is defined as f14_15_16, the combined focal lengths of the seventeenth lens L17 and the eighteenth lens L18 is defined as f17_18, the on-axis thickness of the seventeenth lens L17 is defined as d33, the on-axis thickness of the eighteenth lens L18 is defined as d35, the on-axis distance from the object surface of the microscope objective lens 10 to the exit surface of the first lens L1 is defined as TTL, that is, the total optical length is defined as TTL, the image height of the microscope objective lens 10 is defined as IH, and the following relationship formulas should be satisfied:

$$-3.10 \leq f1\_2/f3 \leq -1.80 \quad (1)$$

$$3.40 \leq f14\_15\_16/f \leq 7.00 \quad (2)$$

$$4.00 \leq f17\_18/(d33+d35) \leq 120.00 \quad (3)$$

$$0.08 \leq IH*f/TTL \leq 0.09 \quad (4)$$

The relationship formula (1) specifies the ratio of the combined focal length f1_2 of the combined lens formed by the first lens L1 and the second lens L2 to the focal length f3 of the third lens L3. It is beneficial to control the light trend between the lenses and the lens structure of the microscope objective lens 10, 20, 30, 40 is compact within the range as specified by the relationship formula (1).

The relationship formula (2) specifies the ratio of the combined focal length f14_15_16 of the lens group at the object side of the microscope objective lens 10, 20, 30, 40 composed of the fourteenth lens L14, the fifteenth lens L15 and the sixteenth lens L16 to the focal length f of the microscope objective lens 10, 20, 30, 40. Within the limited range, it can be ensured that the light has sufficient focusing ability.

The relationship formula (3) specifies the range of the ratio of the focal length to the thickness of the combined lens composed of the seventeenth lens L17 and the eighteenth lens L18. Within the range defined by the relationship formula (3), the combined lens has sufficient refractive power while maintaining a reasonable thickness.

The relationship formula (4) defines the range of the ratio of the product of the image height IH and the focal length f of the microscope objective lens 10, 20, 30, 40 to its total optical length TTL. Within this range, the total optical length of the microscope objective lens 10, 20, 30, 40 is controlled while the imaging range reaches the expected state.

In this technical solution, the above settings can control the trend of light between lenses, which helps to smoothly transition the outgoing light. The lens structure is compact, and the total length of the lens is controlled while the imaging range reaches the expected state. The microscope objective lens has a large numerical aperture so that the light has sufficient convergence ability and has excellent optical performance, meeting the design requirements of low distortion, 20 times magnification, and long working distance.

It should be noted that the units of the above focal length, thickness, image height and total optical length are millimeters.

For example, a curvature radius of the exit-side surface of the tenth lens is defined as R19, a curvature radius of an object-side surface of the tenth lens is defined as R20, and the following relationship formula should be satisfied:

$$-1.60 \leq R19/R20 \leq -2.50 \quad (5)$$

The relationship formula (5) specifies the shape of the tenth lens L10, which helps to smoothly transition the outgoing light and improve the imaging quality.

For example, an on-axis distance from the object surface of the microscope objective lens to an object-side surface of the eighteenth lens is defined as WD, that is, the working distance is defined as WD, a numerical aperture of the microscope objective lens is defined as NA, and the following relationship formula should be satisfied:

$$WD*NA \geq 1.10 \quad (6)$$

The relationship formula (6) specifies the product range of the working distance WD and the numerical aperture NA of the microscope objective lens 10, 20, 30, 40. By specifying the lower limit of the microscope objective lens, it is possible to avoid the working distance WD of the microscope objective lens 10, 20, 30, 40 being too long relative to the numerical aperture NA, thereby achieving satisfactory aberration performance and higher resolution. In addition, by specifying the lower limit of the above product, it is possible to avoid the working distance WD becoming too short, and the user does not have to pay too much attention to prevent the objective lens from colliding with the observed object, thereby improving the work efficiency when performing measurements. In particular, it is often the case that an objective lens with a low numerical aperture is used to observe an object with a very uneven surface when using the microscope objective lens to performing observation. This solution can ensure that the objective lens of low numerical aperture has a sufficiently long working distance by specifying the lower limit of WD*NA. As a result, even an observed object with a large surface unevenness can be measured, thereby achieving high versatility of the microscope objective lens. In other words, within the range specified by the relationship formula (6), the microscope objective lens has sufficient resolution, high working efficiency and high versatility.

In an embodiment, the exit-side surface of the first lens L1 is convex in a paraxial region, and the object-side surface of the first lens L1 is convex in a paraxial region. In other optional solutions, the object-side surface and the exit-side surface of the first lens L1 may also be provided in other concave and convex distributions.

For example, a curvature radius of the exit-side surface of the first lens is defined as R1, a curvature radius of the object-side surface of the first lens is defined as R2, an on-axis thickness of the first lens is defined as d1, and the following relationship formulas should be satisfied:

$$-1.39 \leq (R1+R2)/(R1-R2) \leq -0.24 \quad (7)$$

$$0.03 \leq d1/TTL \leq 0.10 \quad (8)$$

The relationship formula (7) specifies the shape of the first lens L1. Reasonably controlling the shape of the first lens L1 can alleviate the degree of deflection of light after passing through the first lens L1 and effectively reduce aberrations. In addition, the relationship formula −0.87≤(R1+R2)/(R1−R2)≤−0.30 may be satisfied. The relationship formula (8) specifies the ratio range of the on-axis thickness d1 of the first lens L1 to the total optical length TTL of the microscope objective lens 10, 20, 30, 40. Within this range, it is helpful to control the thickness of the first lens L1, and further control the total optical length TTL of the microscope objective lens 10, 20, 30, 40. In addition, the relationship formula 0.05≤d1/TTL≤0.08 may be satisfied.

In an embodiment, an exit-side surface of the second lens L2 is concave in a paraxial region, an object-side surface of the second lens L2 is concave in a paraxial region. In other optional solutions, the object-side surface and the exit-side surface of the second lens L2 may also be provided in other concave and convex distributions.

For example, a curvature radius of the exit-side surface of the second lens L2 is defined as R3, a curvature radius of the object-side surface of the second lens L2 is defined as R4, an on-axis thickness of the second lens L2 is defined as d3, and the following relationship formulas should be satisfied:

$$0.15 \leq (R3+R4)/(R3-R4) \leq 1.13 \quad (9)$$

$$0.01 \leq d3/TTL \leq 0.06 \quad (10)$$

The relationship formula (9) specifies the shape of the second lens. Within the range defined by the relationship formula (9), the second lens L2 can effectively correct the system spherical aberration. In addition, the relationship formula 0.23≤(R3+R4)/(R3−R4)≤0.90 may be satisfied. The relationship formula (10) specifies the ratio range of the on-axis thickness d3 of the second lens L2 to the total optical length TTL of the microscope objective lens 10, 20, 30, 40, which helps to reasonably control the total optical length TTL of the microscope objective lens 10, 20, 30, 40. In addition, the relationship formula 0.01≤d3/TTL≤0.05 may be satisfied.

For example, an object-side surface of the first lens L1 is glued to an exit-side surface of the second lens L2 to form a combined lens having positive refractive power, and the following relationship formula should be satisfied:

$$1.93 \leq f1\_2/f \leq 8.42 \quad (11)$$

In an embodiment, an exit-side surface of the third lens L3 is concave or convex in a paraxial region, and an object-side surface of the third lens L3 is concave in a paraxial region. In other optional solutions, the object-side surface of the third lens L3 may be convex.

For example, a curvature radius of the exit-side surface of the second lens L3 is defined as R5, a curvature radius of the object-side surface of the second lens L3 is defined as R6, an on-axis thickness of the second lens L3 is defined as d5, and the following relationship formulas should be satisfied:

$$0.15 \leq (R5+R6)/(R5-R6) \leq 1.57 \quad (12)$$

$$0.01 \leq d5/TTL \leq 0.03 \quad (13)$$

$$-4.19 \leq f3/f \leq -1.24 \quad (14)$$

The relationship formula (12) specifies the shape of the third lens L3, which helps to reduce the aberration of the microscope objective lens 10, 20, 30, 40. In addition, the relationship formula 0.24≤(R5+R6)/(R5−R6)≤1.25 may be satisfied. The relationship formula (13) specifies the ratio range of the on-axis thickness d15 of the third lens L3 to the total optical length TTL of the microscope objective lens 10, 20, 30, 40. Within this range, it is helpful to control the total optical length TTL of the microscope objective lens 10, 20, 30, 40. In addition, the relationship formula 0.01≤d5/TTL≤0.02 may be satisfied. The relationship formula (14) specifies the ratio of the focal length f3 of the third lens L3 to the focal length f of the microscope objective lens 10, 20, 30, 40. Within this range, it helps to reduce aberrations and improve imaging quality. In addition, the relationship formula −2.62≤f3/f≤−1.55 may be satisfied.

In an embodiment, the exit-side surface of the fourth lens L4 is concave in a paraxial region, and the object-side surface of the fourth lens L4 is concave or convex in a paraxial region. In other optional solutions, the exit-side surface of the fourth lens L4 may be convex.

For example, a curvature radius of the exit-side surface of the fourth lens l4 is defined as R7, a curvature radius of an object-side surface of the fourth lens L4 is defined as R8, an on-axis thickness of the fourth lens L4 is defined as d7, and the following relationship formulas should be satisfied:

$$-2.94 \leq (R7+R8)/(R7-R8) \leq -0.12 \quad (15)$$

$$0.01 \leq d7/TTL \leq 0.06 \quad (16)$$

The relationship formula (15) specifies the shape of the fourth lens L4, so that the fourth lens L4 can effectively correct the system spherical aberration. In addition, the relationship formula of −1.84≤(R7+R8)/(R7−R8)≤−0.15 may be satisfied. The relationship formula (16) specifies the range of the ratio of the on-axis thickness d7 of the fourth lens L4 to the total optical length TTL of the microscope objective lens 10, 20, 30, 40, which is conducive to controlling the total optical length TTL of the microscope objective lens 10, 20, 30, 40. In addition, the relationship formula 0.01≤d7/TTL≤0.05 may be satisfied.

In an embodiment, the exit-side surface of the fifth lens L5 is convex or concave in a paraxial region, and the object-side surface of the fifth lens L5 is convex in a paraxial region. In other optional solutions, the object-side surface of the fifth lens L5 is concave.

For example, a curvature radius of the exit-side surface of the fifth lens L5 is defined as R9, the curvature radius of the object-side surface of the fifth lens L5 is defined as R10, the on-axis thickness of the fifth lens is defined as d9, and the following relationship formulas should be satisfied:

$$0.11 \leq (R9+R10)/(R9-R10) \leq 2.20 \quad (17)$$

$$0.04 \leq d9/TTL \leq 0.15 \quad (18)$$

The relationship formula (17) specifies the shape of the fifth lens L5. Within this range, it is helpful to reduce the spherical aberration of the microscope objective lens 10, 20, 30, 40, and improve the imaging quality. In addition, the relationship formula 0.18≤(R9+R10)/(R9−R10)≤1.76 may be satisfied. The relationship formula (18) specifies the range of the ratio of the on-axis thickness d9 of the fifth lens d9 to the total optical length TTL of the microscope objective lens 10, 20, 30, 40. Within the range defined by the relationship formula (18), it is helpful to reasonably control the total optical length TTL of the microscope objective lens 10, 20, 30, 40. In addition, the relationship formula 0.06≤d9/TTL≤0.12 may be satisfied.

In an embodiment, the exit-side surface of the sixth lens L6 is concave in a paraxial region, and the object-side surface of the sixth lens L6 is convex in a paraxial region. In other optional solutions, the object-side surface and the exit-side surface of the sixth lens L6 may also be provided in other concave and convex distributions.

For example, the curvature radius of the exit-side surface of the sixth lens L6 is defined as R11, the curvature radius of the object-side surface of the sixth lens L6 is defined as R12, the on-axis thickness of the sixth lens L6 is defined as d11, and the following relationship formulas should be satisfied:

$$-10.75 \leq (R11+R12)/(R11-R12) \leq -2.17 \quad (19)$$

$$0.01 \leq d11/TTL \leq 0.03 \quad (20)$$

The relationship formula (19) specifies the shape of the sixth lens L6. Reasonably controlling the shape of the sixth lens L6 is conducive to correcting a problem of an off-axis aberration. In addition, the relationship formula −6.72≤(R11+R12)/(R11−R12)≤−2.71 may be satisfied. The relationship formula (20) specifies the on-axis thickness d11 of the sixth lens L6. Within the range defined by the relationship formula (20), the total optical length TTL of the microscope objective lens 10, 20, 30, 40 can be effectively controlled. In addition, the relationship formula 0.02≤d11/TTL≤0.03 may be satisfied.

For example, the object-side surface of the fourth lens L4 is glued to the exit-side surface of the fifth lens L5, and the object-side surface of the fifth lens L5 is glued to the exit-side surface of the sixth lens L6 to form a combined lens having negative refractive power, and the combined focal length of the fourth lens L4, the fifth lens L5 and the sixth lens L6 is defined as f4_5_6, satisfying the following relationship formula:

$$-7.70 \leq f4\_5\_6/f \leq -1.41 \quad (21)$$

The relationship formula (21) specifies the range of the ratio of the combined focal length of the combined lens composed of the fourth lens L4, the fifth lens L5 and the sixth lens L6 to the focal length f of the microscope objective lens 10, 20, 30, 40. Within the above range, the optical performance of the microscope objective lens 10, 20, 30, 40 can be improved. In addition, the relationship formula −4.81≤f4_5_6/f≤−1.77 may be satisfied.

In an embodiment, the exit-side surface of the seventh lens L7 is concave or convex in a paraxial region, and the object-side surface of the seventh lens L7 is convex in a paraxial region. In other optional solutions, the object-side surface of the seventh lens L7 is concave.

For example, the curvature radius of the exit-side surface of the seventh lens L7 is defined as R13, the curvature radius of the object-side surface of the seventh lens L7 is defined as R14, the on-axis thickness of the seventh lens L7 is defined as d13, the focal length of the seventh lens L7 is defined as f7, and the following relationship formulas should be satisfied:

$$0.41 \le (R13+R14)/(R13-R14) \le 2.60 \quad (22)$$

$$0.02 \le d13/TTL \le 0.09 \quad (23)$$

$$2.16 \le f7/f \le 7.34 \quad (24)$$

The relationship formula (22) specifies the shape of the seventh lens L7. Within the range of the relationship formula, the seventh lens L7 can effectively correct the system spherical aberration, which helps to improve the image quality. In addition, the relationship formula 0.66≤(R13+R14)/(R13−R14)≤2.08 may be satisfied. The relationship formula (23) specifies the on-axis thickness d13 of the seventh lens L7. Within this range, it helps to reduce the total optical length TTL of the microscope objective lens 10, 20, 30, 40. In addition, the relationship formula 0.04≤d13/TTL≤0.07 may be satisfied. The relationship formula (24) specifies the ratio of the focal length f7 of the seventh lens L7 to the focal length f of the microscope objective lens 10, 20, 30, 40. Within this range, it helps to reduce aberrations and improve image quality. In addition, the relationship formula 3.46≤f7/f≤5.87 may be satisfied.

In an embodiment, the exit-side surface of the eighth lens L8 is convex in a paraxial region, and the object-side surface of the eighth lens L8 is convex in a paraxial region. In other optional solutions, the object-side surface and the exit-side surface of the eighth lens L8 may also be provided in other concave and convex distributions.

For example, the curvature radius of the exit-side surface of the eighth lens L8 is defined as R15, the curvature radius of the object-side surface of the eighth lens L8 is defined as R16, the on-axis thickness of the eighth lens L8 is defined as d15, and the following relationship formulas should be satisfied:

$$0.19 \le (R15+R16)/(R15-R16) \le 1.15 \quad (25)$$

$$0.05 \le d15/TTL \le 0.16 \quad (26)$$

The relationship formula (25) specifies the shape of the eighth lens L8. Within the range, the degree of deflection of light passing through the eighth lens L8 can be alleviated, effectively reducing aberrations. In addition, the relationship formula 0.30≤(R15+R16)/(R15−R16)≤0.92 may be satisfied. The relationship formula (26) specifies the on-axis thickness d15 of the eighth lens L8. Within this range, it is helpful to reduce the total optical length TTL of the microscope objective lens 10, 20, 30, and 40. In addition, the relationship formula 0.08≤d15/TTL≤0.13 may be satisfied.

In an embodiment, the exit-side surface of the ninth lens L9 is concave in a paraxial region, and the object-side surface of the ninth lens L9 is convex in a paraxial region. In other optional solutions, the object-side surface and the exit-side surface of the ninth lens L9 may also be provided in other concave and convex distributions.

For example, the curvature radius of the exit-side surface of the ninth lens L9 is defined as R17, the curvature radius of the object-side surface of the ninth lens L9 is defined as R18, the on-axis thickness of the ninth lens L9 is defined as d17, and the following relationship formulas should be satisfied:

$$-5.69 \le (R17+R18)/(R17-R18) \le -0.82 \quad (27)$$

$$0.01 \le d17/TTL \le 0.04 \quad (28)$$

The relationship formula (27) specifies the shape of the ninth lens L9. Within the range, it is beneficial to improve the optical performance of the microscope objective lens 10, 20, 30, 40. In addition, the relationship formula −3.56≤(R17+R18)/(R17−R18)≤−1.02 may be satisfied. The relationship formula (28) specifies the ratio of the thickness d17 of the ninth lens L9 to the total optical length TTL of the microscope objective lens 10, 20, 30, 40. Within the range, it is beneficial to reasonably control the total optical length TTL of the microscope objective lens 10, 20, 30, 40. In addition, the relationship formula 0.02≤d17/TTL≤0.03 may be satisfied.

For example, the object-side surface of the eighth lens L8 is glued to the exit-side surface of the ninth lens L9 to form a combined lens having positive refractive power, the combined focal length of the eighth lens L8 and the ninth lens L9 is defined as f8_9, and the following relationship formula should be satisfied:

$$4.08 \le f8\_9/f \le 84.27 \quad (29)$$

The relationship formula (29) specifies the ratio of the focal length f8_9 of the combined lens formed by the eighth lens L8 and the ninth lens L9 to the focal length f of the microscope objective lens 10, 20, 30, 40. In this way, the optical performance of the microscope objective lens 10, 20, 30, 40 can be improved. In addition, the relationship formula 6.53≤f8_9/f≤67.42 may be satisfied.

In an embodiment, the exit-side surface of the tenth lens L10 is convex in a paraxial region, and the object-side surface of the tenth lens L10 is convex in a paraxial region. In other optional embodiments, the object-side surface and the exit-side surface of the tenth lens L10 may also be provided in other concave and convex distributions.

For example, the curvature radius of the exit-side surface of the tenth lens L10 is defined as R19, the curvature radius of the object-side surface of the tenth lens L10 is defined as R20, the on-axis thickness of the tenth lens is defined as d19, the focal length of the tenth lens is defined as f10, and the following relationship formulas should be satisfied:

$$-1.10 \le (R19+R20)/(R19-R20) \le 0.31 \quad (30)$$

$$0.03 \le d19/TTL \le 0.11 \quad (31)$$

$$2.38 \le f10/f \le 12.26 \quad (32)$$

The relationship formula (30) specifies the shape of the tenth lens L10. Within this range, the degree of deflection of light after passing through the first lens L1 can be alleviated, effectively reducing aberrations. Preferably, the relationship formula −0.69≤(R19+R20)/(R19−R20)≤0.25 may be satisfied. The relational expression (31) specifies the on-axis thickness d19 of the tenth lens L10, which helps to reduce the total optical length TTL of the microscope objective lens 10, 20, 30, 40. Preferably, the relationship formula 0.06≤d19/TTL≤0.12 may be satisfied. The relationship formula (32) specifies the range of the ratio of the focal length of the tenth lens L10 to the focal length f of the microscope objective lens 10, 20, 30, 40, which helps to reduce aberrations and improve imaging quality. Preferably, the relationship formula 3.81≤f10/f≤9.81 may be satisfied.

In an embodiment, the exit-side surface of the eleventh lens L11 is convex in a paraxial region, and the object-side surface of the eleventh lens L11 is convex in a paraxial region. In other optional solutions, the object-side surface and the exit-side surface of the tenth lens L10 may also be provided in other concave and convex distributions.

For example, the curvature radius of the exit-side surface of the eleventh lens L11 is defined as R21, the curvature radius of the object-side surface of the eleventh lens L11 is defined as R22, the on-axis thickness of the eleventh lens L11 is defined as d21, and the following relationship formulas should be satisfied:

$$0.02 \le (R21+R22)/(R21-R22) \le 1.02 \quad (33)$$

$$0.03 \le d21/TTL \le 0.13 \quad (34)$$

The relationship formula (33) specifies the shape of the eleventh lens L11. Within the range, the degree of deflection of light passing through the eleventh lens L11 can be alleviated, aberrations can be effectively reduced. Preferably, the relationship formula 0.04≤(R21+R22)/(R21−R22) ≤0.81 may be satisfied. The relationship formula (34) specifies the on-axis thickness d21 of the eleventh lens L11, which can effectively reduce the total optical length TTL of the microscope objective lens 10, 20, 30, 40, making the structure of the microscope objective lens 10, 20, 30, 40 compact. Preferably, the relationship formula 0.04≤d21/TTL≤0.11 may be satisfied.

In an embodiment, the exit-side surface of the twelfth lens L12 is concave in a paraxial region, and the object-side surface of the twelfth lens L12 is concave or convex in a paraxial region. In other optional solutions, the exit-side surface of the twelfth lens L12 may be convex.

For example, the curvature radius of the exit-side surface of the twelfth lens L12 is defined as R23, the curvature radius of the object-side surface of the twelfth lens L12 is defined as R24, the on-axis thickness of the twelfth lens L12 is defined as d23, and the following relationship formulas should be satisfied:

$$-2.18 \le (R23+R24)/(R23-R24) \le -0.29 \quad (35)$$

$$0.01 \le d23/TTL \le 0.04 \quad (36)$$

The relationship formula (35) specifies the shape of the twelfth lens L12, so that the twelfth lens L12 can effectively correct the system spherical aberration. Preferably, the relationship formula −1.37≤(R23+R24)/(R23−R24)≤−0.36 may be satisfied. The relationship formula (36) specifies the on-axis thickness d23 of the twelfth lens L12. Within this range, it is helpful to control the total optical length TTL of the microscope objective lens 10. Preferably, the relationship formula 0.02≤d23/TTL≤0.03 may be satisfied.

For example, the object-side surface of the eleventh lens L11 is glued to the exit-side surface of the twelfth lens L12 to form a combined lens having negative refractive power, and the combined focal length of the eleventh lens L11 and the twelfth lens L12 is defined as f11_12, and the following relationship formula should be satisfied:

$$-879.88 \le f11\_12/f \le -5.21 \quad (37)$$

The relationship formula (37) specifies the range of the ratio of the combined focal length f11_12 of the combined lens formed by the eleventh lens L11 and the twelfth lens L12 to the focal length f of the microscope objective lens 10, 20, 30, 40, which helps to improve the optical performance of the microscope objective lens 10, 20, 30, 40. Preferably, the relationship formula −549.93≤f11_12/f≤−6.51 may be satisfied.

In an embodiment, the exit-side surface of the thirteenth lens L13 is convex in a paraxial region, and the object-side surface of the thirteenth lens L13 is concave or convex in a paraxial region. In other optional solutions, the exit-side surface of the thirteenth lens L13 is concave.

For example, the curvature radius of the exit-side surface of the thirteenth lens L13 is defined as R25, the curvature radius of the object-side surface of the thirteenth lens L13 is defined as R26, the on-axis thickness of the thirteenth lens L13 is defined as d25, the focal length of the thirteenth lens L13 is defined as f13, and the following relationship formulas should be satisfied:

$$-3.04 \le (R25+R26)/(R25-R26) \le -0.53 \quad (38)$$

$$0.03 \le d25/TTL \le 0.10 \quad (39)$$

$$1.68 \le f13/f \le 7.42 \quad (40)$$

The relationship formula (38) specifies the shape of the thirteenth lens L13. Within this range, the spherical aberration of the microscope objective lens 10, 20, 30, 40 can be reduced. Preferably, the relationship formula −1.90≤(R25+R26)/(R25−R26)≤−0.66 may be satisfied. The relationship formula (39) specifies the on-axis thickness d25 of the thirteenth lens L13. Within this range, it is beneficial to effectively reduce the total optical length TTL of the microscope objective lens 10, 20, 30, 40. Preferably, the relationship formula 0.05≤d25/TTL≤0.08 may be satisfied. The relationship formula (40) specifies the range of the ratio of the focal length f13 of the thirteenth lens L13 to the focal length f of the microscope objective lens 10, 20, 30, 40, which is helpful to reduce aberration and improve imaging quality. Preferably, the relationship formula 2.69≤f13/f≤5.93 may be satisfied.

In an embodiment, the exit-side surface of the fourteenth lens L14 is convex in a paraxial region, and the object-side surface of the fourteenth lens L14 is convex in a paraxial region. In other optional solutions, the exit-side surface and the object-side surface of the fourteenth lens L14 may also be provided in other concave and convex distributions.

For example, the curvature radius of the exit-side surface of the fourteenth lens L14 is defined as R27, the curvature radius of the object-side surface of the fourteenth lens L14 is defined as R28, the on-axis thickness of the fourteenth lens L14 is defined as d27, and the following relationship formulas should be satisfied:

$$-1.06 \le (R27+R28)/(R27-R28) \le -0.27 \quad (41)$$

$$0.04 \le d27/TTL \le 0.13 \quad (42)$$

The relationship formula (41) specifies the shape of the fourteenth lens L14. Within the range, the fourteenth lens L14 can effectively correct the system spherical aberration. Preferably, the relationship formula $-0.66 \le (R27+R28)/(R27-R28) \le -0.34$ may be satisfied. The relationship formula (42) specifies the on-axis thickness d27 of the fourteenth lens L14, which helps to reduce the total optical length TTL of 10, 20, 30, 40 of the microscope objective lens. Preferably, the relationship formula $0.07 \le d27/TTL \le 0.10$ may be satisfied.

In an embodiment, the exit-side surface of the fifteenth lens L15 is concave in a paraxial region, and the object-side surface of the fifteenth lens L15 is concave in a paraxial region. In other optional solutions, the exit-side surface and the object-side surface of the fifteenth lens L15 may also be provided in other concave and convex distributions.

For example, the curvature radius of the exit-side surface of the fifteenth lens L15 is defined as R29, the curvature radius of the object-side surface of the fifteenth lens L15 is defined as R30, the on-axis thickness of the fifteenth lens L15 is defined as d29, and the following relationship formulas should be satisfied:

$$-0.05 \le (R29+R30)/(R29-R30) \le 0.98 \quad (43)$$

$$0.01 \le d29/TTL \le 0.03 \quad (44)$$

The relationship formula (43) specifies the shape of the fifteenth lens L15. Within this range, the degree of deflection of light passing through the fifteenth lens L15 can be alleviated, effectively reducing aberrations. Preferably, the relationship formula $-0.03 \le (R29+R30)/(R29-R30) \le 0.79$ may be satisfied. The relationship formula (44) specifies the on-axis thickness d29 of the fifteenth lens L15, which helps to reduce the total optical length TTL of the microscope objective lens 10, 20, 30, 40. Preferably, the relationship formula $0.01 \le d29/TTL \le 0.02$ may be satisfied.

In an embodiment, the exit-side surface of the sixteenth lens L16 is convex in a paraxial region, and the object-side surface of the sixteenth lens L16 is convex in a paraxial region. In other optional solutions, the exit-side surface and the object-side surface of the sixteenth lens L16 may also be provided in other concave and convex distributions.

For example, the curvature radius of the exit-side surface of the sixteenth lens L16 is defined as R31, the curvature radius of the object-side surface of the sixteenth lens L16 is defined as R32, the on-axis thickness of the sixteenth lens L16 is defined as d31, and the following relationship formulas should be satisfied:

$$-1.45 \le (R31+R32)/(R31-R32) \le -0.29 \quad (45)$$

$$0.02 \le d31/TTL \le 0.09 \quad (46)$$

The relationship formula (45) specifies the shape of the sixteenth lens L16. Within this range, the deflection degree of light passing through the sixteenth lens L16 can be alleviated, the aberration can be effectively reduced. Preferably, the relationship formula $-0.91 \le (R31+R32)/(R31-R32) \le -0.36$ may be satisfied. The relationship formula (46) specifies the on-axis thickness d31 of the sixteenth lens L16. Within the range, the optical performance of the microscope objective lens 10, 20, 30, 40 can be improved. Preferably, the relationship formula $0.03 \le d31/TTL \le 0.07$ may be satisfied.

In an embodiment, the object-side surface of the fourteenth lens L14 is glued to the exit-side surface of the fifteenth lens L15 and the object-side surface of the fifteenth lens L15 is glued to the exit-side surface of the sixteenth lens L16, to form a combined lens having positive refractive power.

In an embodiment, the exit-side surface of the seventeenth lens L17 is convex in a paraxial region, and the object-side surface of the seventeenth lens L17 is convex in a paraxial region. In other optional solutions, the exit-side surface and the object-side surface of the seventeenth lens L17 may also be provided in other concave and convex distributions.

For example, the curvature radius of the exit-side surface of the seventeenth lens L17 is defined as R33, the curvature radius of the object-side surface of the seventeenth lens L17 is defined as R34, the on-axis thickness of the seventeenth lens L17 is defined as d33, and the following relationship formulas should be satisfied:

$$-1.08 \le (R33+R34)/(R33-R34) \le -0.17 \quad (47)$$

$$0.02 \le d33/TTL \le 0.08 \quad (48)$$

The relationship formula (47) specifies the shape of the seventeenth lens L17. Within this range, the optical performance and imaging quality of the microscope objective lens 10 can be improved. Preferably, the relationship formula $-0.67 \le (R33+R34)/(R33-R34) \le -0.22$ may be satisfied. The relationship formula (48) specifies the range of the ratio of the on-axis thickness d33 of the seventeenth lens L17 to the total optical length TTL of the microscope objective lens 10, 20, 30, 40, which is beneficial to control the total optical length TTL of the microscope objective lens 10, 20, 30, 40. Preferably, the relationship formula $0.04 \le d33/TTL \le 0.06$ may be satisfied.

In an embodiment, the exit-side surface of the eighteenth lens L18 is concave in a paraxial region, and the object-side surface of the eighteenth lens L18 is concave in a paraxial region. In other optional embodiments, the exit-side surface and the object-side surface of the eighteenth lens L18 may also be provided in other concave and convex distributions.

For example, the curvature radius of the exit-side surface of the eighteenth lens L18 is defined as R35, the curvature radius of the object-side surface of the eighteenth lens L18 is defined as R36, the on-axis thickness of the eighteenth lens L18 is defined as d35, and the following relationship formulas should be satisfied:

$$0.25 \le (R35+R36)/(R35-R36) \le 0.93 \quad (49)$$

$$0.01 \le d35/TTL \le 0.04 \quad (50)$$

The relationship formula (49) specifies the shape of the eighteenth lens L18. Within this range, the deflection degree of light passing through the eighteenth lens L18 can be alleviated, the aberration can be effectively reduced. Preferably, the relationship formula 0.40≤(R35+R36)/(R35−

R36)≤0.74 may be satisfied. The relationship formula (50) specifies the on-axis thickness d35 of the eighteenth lens L18. Within the range, it is beneficial to reduce the total optical length TTL of the microscope objective lens 10, 20, 30, 40. Preferably, the relationship formula 0.01≤d35/TTL≤0.03 may be satisfied.

In this embodiment, the exit-side surface of the seventeenth lens L17 is glued to the object-side surface of the eighteenth lens L18, to form a combined lens having positive refractive power, and the combined focal length f17_18 of the combined lens also satisfies the following relationship formula:

$$1.30 \le f17\_18/f \le 81.29 \quad (51)$$

Within the conditions defined by the relationship formula (51), the optical performance of the microscope objective lens 10, 20, 30, and 40 can be improved. Preferably, the relationship formula 2.08≤f17_18/f≤65.03 may be satisfied.

In this solution, an optical element such as an optical filter GF is provided on the object side of the eighteenth lens L18. The optical filter GF can be a glass cover plate or an optical filter, as shown in FIG. 1. In other solutions, the optical filter GF is at other positions.

The microscope objective lens 10, 20, 30, and 40 of the embodiments of the present disclosure can control the trend of light between lenses. The lens structure is compact, and the total length of the lens is controlled while ensuring that the imaging range reaches the expected state. The microscope objective lens has a large numerical aperture to ensure that the light has sufficient convergence and has excellent optical performance, meeting the design requirements of low distortion, 20 times magnification, and long working distance.

The microscope objective lens 10 of the present disclosure will be described below by examples. The symbols recorded in each example are as shown in Table 1, and the focal length, the on-axis distance, the curvature radius, the on-axis thickness, the inflection position, and the stationary position are measured in millimeters.

TTL represents the total optical length (the on-axis distance from the object-side surface of the first lens L1 to the imaging surface), in millimeters.

First Embodiment

The exit-side surface of the first lens L1 is convex in a paraxial region, and the object-side surface of the first lens L1 is convex in a paraxial region.

The exit-side surface of the second lens L2 is concave in a paraxial region, and the object-side surface of the second lens L2 is concave in a paraxial region.

The third lens L3 has negative refractive power, and the exit-side surface of the third lens L3 is concave in a paraxial region, and the object-side surface of the third lens L3 is concave in a paraxial region.

The exit-side surface of the fourth lens L4 is concave in a paraxial region, and the object-side surface of the fourth lens L4 is concave in a paraxial region.

The exit-side surface of the fifth lens L5 is convex in a paraxial region, and the object-side surface of the fifth lens L5 is convex in a paraxial region.

The exit-side surface of the sixth lens L6 is concave in a paraxial region, and the object-side surface of the sixth lens L6 is convex in a paraxial region.

The seventh lens L7 has positive refractive power, the exit-side surface in a paraxial region of the seventh lens L7 is convex, and the object-side surface in a paraxial region of the seventh lens L7 is convex.

The exit-side surface of the eighth lens L8 is convex in a paraxial region, and the object-side surface of the eighth lens L8 is convex in a paraxial region.

The exit-side surface of the ninth lens L9 is concave in a paraxial region, and its object-side surface of the ninth lens L9 is convex in a paraxial region.

The tenth lens L10 has positive refractive power, the exit-side surface in a paraxial region of the tenth lens L10 is convex, and the object-side surface in a paraxial region of the tenth lens L10 is convex.

The exit-side surface of the 11th lens L11 is convex in a paraxial region, and the object-side surface of the 11th lens L11 is convex in a paraxial region.

The exit-side surface in a paraxial region of the 12th lens L12 is concave, and the object-side surface in a paraxial region of the 12th lens L12 is concave.

The 13th lens L13 has a positive refractive power, and the exit-side surface of the 13th lens L13 is convex in a paraxial region, and the object-side surface of the 13th lens L13 is concave in a paraxial region.

The exit-side surface in a paraxial region of the 14th lens L14 is convex, and the object-side surface in a paraxial region of the 14th lens L14 is convex.

The exit-side surface in a paraxial region of the 15th lens L15 is concave, and the object-side surface in a paraxial region of the 15th lens L15 is concave.

The exit-side surface in a paraxial region of the 16th lens L16 is convex, and the object-side surface in a paraxial region of the 16th lens L16 is convex.

The exit-side surface in a paraxial region of the 17th lens L17 is convex, and the object-side surface in a paraxial region of the 17th lens L17 is convex.

The exit-side surface in a paraxial region of the 18th lens L18 is concave, and the object-side surface in a paraxial region of the 18th lens L18 is concave.

FIG. 1 is a schematic structural diagram of the microscope objective lens 10 in the first embodiment. The following shows the design data of the microscope objective lens 10 in the first embodiment of the present disclosure.

Table 1 lists the curvature radius R of the exit-side surface and object-side surface, the on-axis thickness of the lens, the on-axis distance d between the lenses, the refractive index nd and the Abbe number νd of the first lens L1 to the eighteenth lens L18 constituting the microscope objective lens 10 in the first embodiment of the present disclosure. It should be noted that in this embodiment, the distance, the radius and the thickness are all measured in millimeters (mm).

TABLE 1

| | R | D | | nd | | νd | |
|---|---|---|---|---|---|---|---|
| R1 | 15.600 | d1= | 4.334 | nd1 | 1.8042 | νd1 | 46.500 |
| R2 | −50.214 | d2= | 0.000 | | | | |
| R3 | −50.214 | d3= | 1.400 | nd2 | 1.5503 | νd2 | 75.500 |
| R4 | 14.894 | d4= | 2.661 | | | | |
| R5 | −36.931 | d5= | 1.400 | nd3 | 1.5928 | νd3 | 68.630 |
| R6 | 13.971 | d6= | 3.624 | | | | |
| R7 | −10.741 | d7= | 1.400 | nd4 | 1.4875 | νd4 | 70.230 |
| R8 | 15.632 | d8= | 0.000 | | | | |
| R9 | 15.632 | d9= | 6.800 | nd5 | 1.4370 | νd5 | 95.100 |
| R10 | −10.006 | d10= | 0.000 | | | | |
| R11 | −10.006 | d11= | 1.500 | nd6 | 1.7200 | νd6 | 50.230 |
| R12 | −18.297 | d12= | 0.200 | | | | |

TABLE 1-continued

| | R | | D | | nd | | vd |
|---|---|---|---|---|---|---|---|
| R13 | 242.992 | d13= | 3.973 | nd7 | 1.4970 | vd7 | 81.610 |
| R14 | −23.355 | d141= | 0.100 | | | | |
| ST | ∞ | d142= | 0.100 | / | / | / | / |
| R15 | 38.797 | d15= | 7.051 | nd8 | 1.4370 | vg8 | 95.100 |
| R16 | −15.621 | d16= | 0.000 | | | | |
| R17 | −15.621 | d17= | 1.800 | nd9 | 1.6968 | vg9 | 55.460 |
| R18 | −102.471 | d18= | 0.627 | | | | |
| R19 | 46.782 | d19= | 5.138 | nd10 | 1.4370 | vg10 | 95.100 |
| R20 | −30.592 | d20= | 0.651 | | | | |
| R21 | 30.669 | d21= | 5.353 | nd11 | 1.4370 | vg11 | 95.100 |
| R22 | −28.098 | d22= | 0.000 | | | | |
| R23 | −28.098 | d23= | 1.800 | nd12 | 1.7725 | vg12 | 49.620 |
| R24 | 71.892 | d24= | 0.200 | | | | |
| R25 | 18.017 | d25= | 4.218 | nd13 | 1.4970 | vg13 | 81.610 |
| R26 | 848.901 | d26= | 0.200 | | | | |
| R27 | 11.563 | d27= | 5.674 | nd14 | 1.4970 | vg14 | 81.610 |
| R28 | −27.466 | d28= | 0.000 | | | | |
| R29 | −27.466 | d29= | 1.400 | nd15 | 1.7995 | vg15 | 42.220 |
| R30 | 28.757 | d30= | 0.000 | | | | |
| R31 | 28.757 | d31= | 2.300 | nd16 | 1.5503 | vg16 | 75.500 |
| R32 | −71.927 | d32= | 0.200 | | | | |
| R33 | 7.737 | d33= | 3.064 | nd17 | 1.9004 | vg17 | 37.370 |
| R34 | −20.054 | d34= | 0.000 | | | | |
| R35 | −20.054 | d35= | 1.400 | nd18 | 1.8042 | vg18 | 46.500 |
| R36 | 4.892 | d36= | 1.080 | | | | |
| Object side | ∞ | / | / | / | / | / | / |

The meanings of the symbols in the above table are as follows.

R: the curvature radius of the optical surface, or the central curvature radius for lenses;

ST: aperture;

R1: the curvature radius of the exit-side surface of the first lens L1;

R2: the curvature radius of the object-side surface of the first lens L1;

R3: the curvature radius of the exit-side surface of the second lens L2;

R4: the curvature radius of the object-side surface of the second lens L2;

R5: the curvature radius of the exit-side surface of the third lens L3;

R6: the curvature radius of the object-side surface of the third lens L3;

R7: the curvature radius of the exit-side surface of the fourth lens L4;

R8: the curvature radius of the object-side surface of the fourth lens L4;

R9: the curvature radius of the exit-side surface of the fifth lens L5;

R10: the curvature radius of the object-side surface of the fifth lens L5;

R11: the curvature radius of the exit-side surface of the sixth lens L6;

R12: the curvature radius of the object-side surface of the sixth lens L6;

R13: the curvature radius of the exit-side surface of the seventh lens L7;

R14: the curvature radius of the object-side surface of the seventh lens L7;

R15: the curvature radius of the exit-side surface of the eighth lens L8;

R16: the curvature radius of the object-side surface of the eighth lens L8;

R17: the curvature radius of the exit-side surface of the ninth lens L9;

R18: the curvature radius of the object-side surface of the ninth lens L9;

R19: the curvature radius of the exit-side surface of the tenth lens L10;

R20: the curvature radius of the object-side surface of the tenth lens L10;

R21: the curvature radius of the exit-side surface of the eleventh lens L11;

R22: the curvature radius of the object-side surface of the eleventh lens L11;

R23: the curvature radius of the exit-side surface of the twelfth lens L12;

R24: the curvature radius of the object-side surface of the twelfth lens L12;

R25: the curvature radius of the exit-side surface of the thirteenth lens L13;

R26: the curvature radius of the object-side surface of the thirteenth lens L13;

R27: the curvature radius of the exit-side surface of the fourteenth lens L14;

R28: the curvature radius of the object-side surface of the fourteenth lens L14;

R29: the curvature radius of the exit-side surface of the fifteenth lens L15;

R30: the curvature radius of the object-side surface of the fifteenth lens L15;

R31: the curvature radius of the exit-side surface of the sixteenth lens L16;

R32: the curvature radius of the object-side surface of the sixteenth lens L16;

R33: the curvature radius of the exit-side surface of the seventeenth lens L17;

R34: the curvature radius of the object-side surface of the seventeenth lens L17;

R35: the curvature radius of the exit-side surface of the eighteenth lens L18;

R36: the curvature radius of the object-side surface of the eighteenth lens L18;

d: the on-axis thickness of lens, the on-axis distance between lenses;

d1: the on-axis thickness of the first lens L1;

d2: the on-axis distance from the exit-side surface of the first lens L1 to the object-side surface of the second lens L2;

d3: the on-axis thickness of the second lens L2;

d4: the on-axis distance from the exit-side surface of the second lens L2 to the object-side surface of the third lens L3;

d5: the on-axis thickness of the third lens L3;

d6: the on-axis distance from the exit-side surface of the third lens L3 to the object-side surface of the fourth lens L4;

d7: the on-axis thickness of the fourth lens L4;

d8: the on-axis distance from the exit-side surface of the fourth lens L4 to the object-side surface of the fifth lens L5;

d9: the on-axis thickness of the fifth lens L5;

d10: the on-axis distance from the exit-side surface of the fifth lens L5 to the object-side surface of the sixth lens L6;

d11: the on-axis thickness of the sixth lens L6;

d12: the on-axis distance from the exit-side surface of the sixth lens L6 to the object-side surface of the seventh lens L7;

d13: the on-axis thickness of the seventh lens L7;

d141: the on-axis distance from the exit-side surface of the seventh lens L7 to the aperture ST;

d142: the on-axis distance from the aperture ST to the object-side surface of the eighth lens L8;

d15: the on-axis thickness of the eighth lens L8;

d16: the on-axis distance from the exit-ide surface of the eighth lens L8 to the object-side surface of the ninth lens L9;

d17: the on-axis thickness of the ninth lens L9;

d18: the axial distance from the exit-side surface of the ninth lens L9 to the object-side surface of the tenth lens L10;

d19: the on-axis thickness of the tenth lens L10;

d20: the on-axis distance from the exit-side surface of the tenth lens L10 to the object-side surface of the eleventh lens L11;

d21: the on-axis thickness of the eleventh lens L11;

d22: the on-axis distance from the exit-side surface of the eleventh lens L11 to the object-side surface of the twelfth lens L12;

d23: the on-axis thickness of the twelfth lens L12;

d24: the on-axis distance from the exit-side surface of the twelfth lens L12 to the object-side surface of the thirteenth lens L13;

d25: the on-axis thickness of the thirteenth lens L13;

d26: the on-axis distance from the exit-side surface of the thirteenth lens L13 to the object-side surface of the fourteenth lens L14;

d27: the on-axis thickness of the fourteenth lens L14;

d28: the on-axis distance from the exit-side surface of the fourteenth lens L14 to the object-side surface of the fifteenth lens L15;

d29: the on-axis distance of the fifteenth lens L15;

d30: the on-axis distance from the exit-side surface of the fifteenth lens L15 to the object-side surface of the sixteenth lens L16;

d31: the on-axis thickness of the sixteenth lens L16;

d32: the on-axis distance from the exit-side surface of the sixteenth lens L16 to the object-side surface of the seventeenth lens L17;

d33: the on-axis thickness of the seventeenth lens L17;

d34: the on-axis distance from the exit-side surface of the seventeenth lens L17 to the object-side surface of the eighteenth lens L18;

d35: the on-axis thickness of the eighteenth lens L18;

d36: the on-axis distance from the exit-side surface of the eighteenth lens L18 to the object surface;

nd: the refractive index of the d line (the d line refers to green light with a wavelength of 550 nm);

nd1: the refractive index of the d line of the first lens L1;

nd2: the refractive index of the d line of the second lens L2;

nd3: the refractive index of the d line of the third lens L3;

nd4: the refractive index of the d line of the fourth lens L4;

nd5: the refractive index of the d line of the fifth lens L5;

nd6: the refractive index of the d line of the sixth lens L6;

nd7: the refractive index of the d line of the seventh lens L7;

nd8: the refractive index of the d line of the eighth lens L8;

nd9: the refractive index of the d line of the ninth lens L9;

nd10: the refractive index of the d line of the tenth lens L10;

nd11: the refractive index of the d line of the eleventh lens L11;

nd12: the refractive index of the d line of the twelfth lens L12;

nd13: the refractive index of the d line of the thirteenth lens L13;

nd14: the refractive index of the d line of the fourteenth lens L14;

nd15: the refractive index of the d line of the fifteenth lens L15;

nd16: the refractive index of the d line of the sixteenth lens L16;

nd17: the refractive index of the d line of the seventeenth lens L17;

nd18: the refractive index of the d line of the eighteenth lens L18;

vd: the Abbe number;

vd1: the Abbe number of the first lens L1;

vd2: the Abbe number of the second lens L2;

vd3: the Abbe number of the third lens L3;

vd4: the Abbe number of the fourth lens L4;

vd5: the Abbe number of the fifth lens L5;

vd6: the Abbe number of the sixth lens L6;

vd7: the Abbe number of the seventh lens L7;

vd8: the Abbe number of the eighth lens L8;

vd9: the Abbe number of the ninth lens L9;

vd10: the Abbe number of the tenth lens L10;

vd11: the Abbe number of the eleventh lens L11;

vd12: the Abbe number of the twelfth lens L12;

vd13: the Abbe number of the thirteenth lens L13;

vd14: the Abbe number of the fourteenth lens L14;

vd15: the Abbe number of the fifteenth lens L15;

vd16: the Abbe number of the sixteenth lens L16;

vd17: the Abbe number of the seventeenth lens L17;

vd18: the Abbe number of the eighteenth lens L18.

In addition, in the subsequent Table 5, the values corresponding to the various parameters in the first embodiment and the parameters specified in the relationship formulas are also listed.

Figure 2:
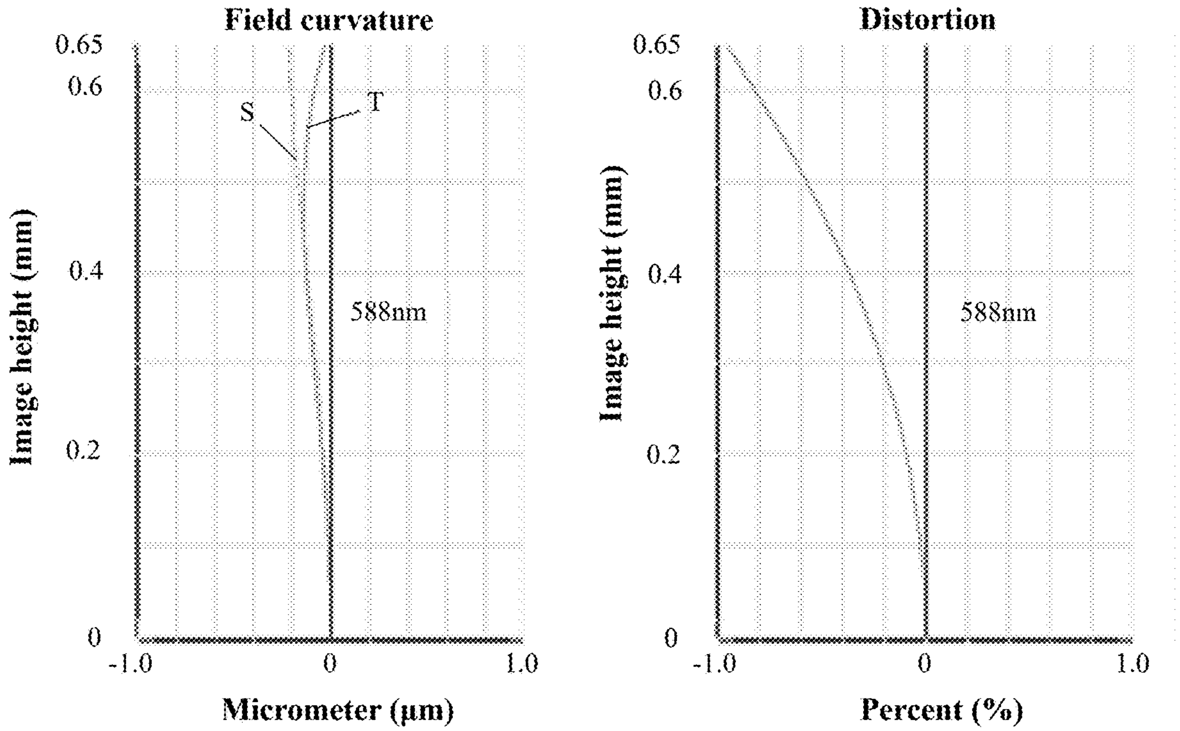
FIG. 2 is a schematic diagram of the field curvature and distortion of the microscope objective lens shown in FIG. 1.
Figure 3:
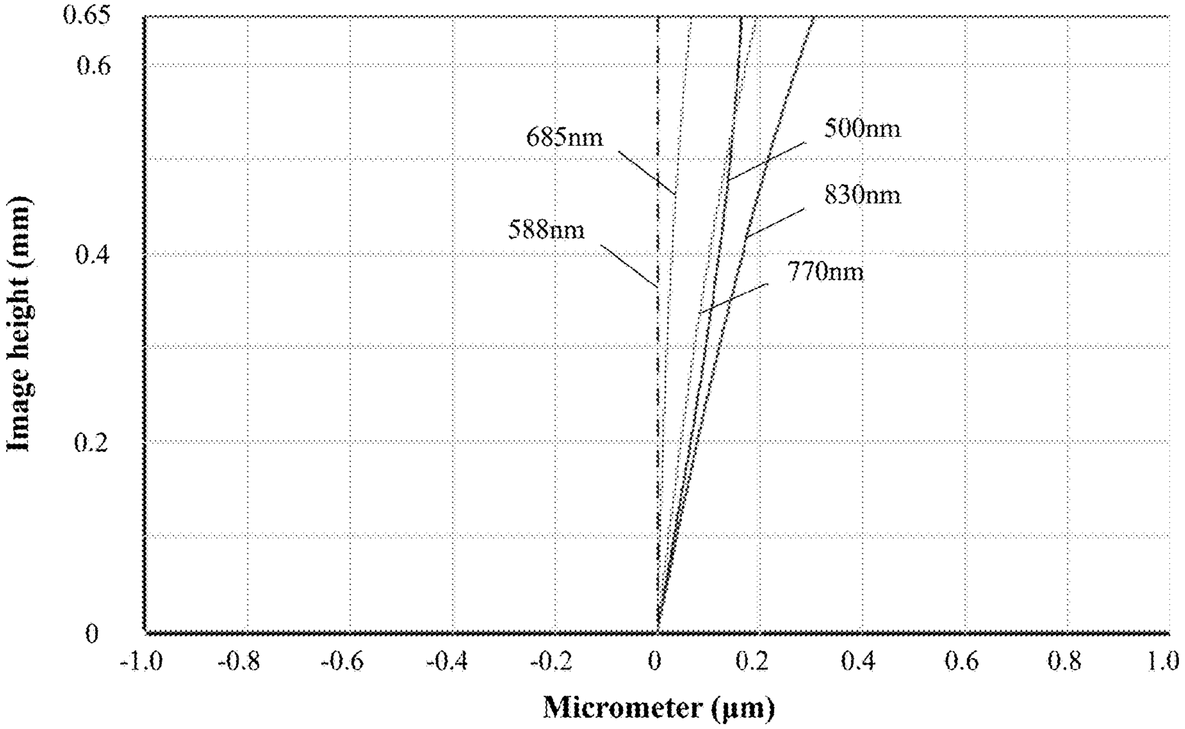
FIG. 3 is a schematic diagram of the lateral color of the microscope objective lens shown in FIG. 1.
Figure 4:
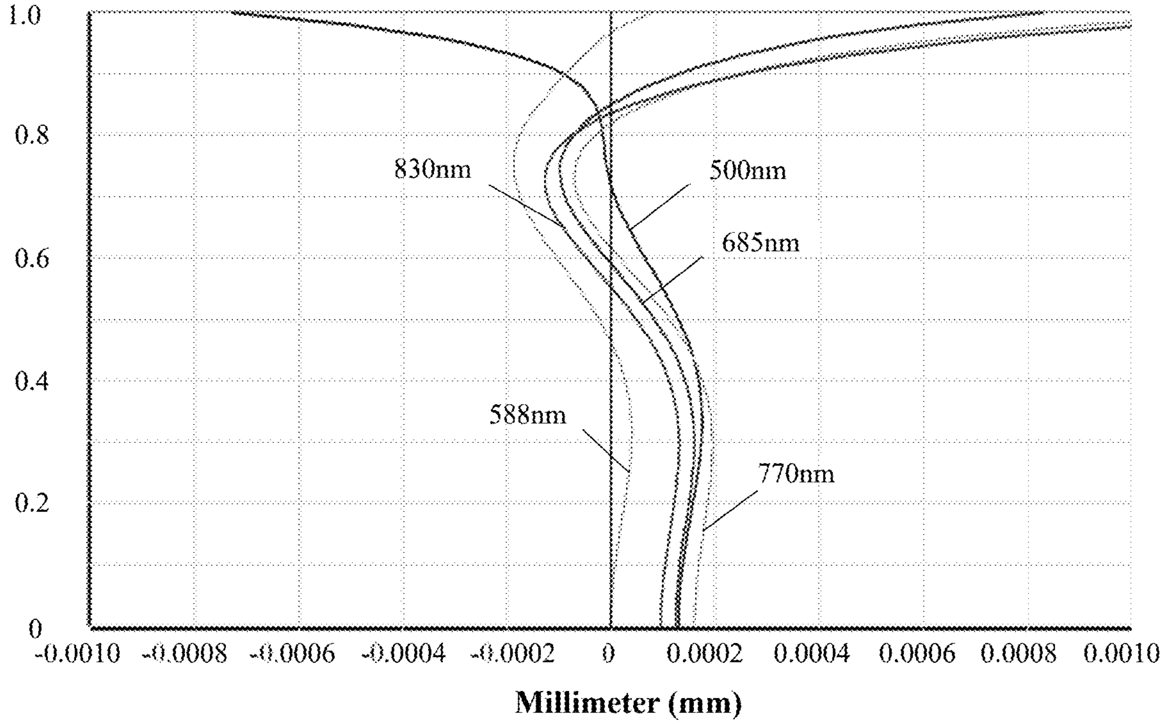
FIG. 4 is a schematic diagram of the longitudinal aberration of the microscope objective lens shown in FIG. 1.

FIG. 2 is a schematic diagram showing the field curvature and distortion of light with a wavelength of 588 nanometers (nm) after passing through the microscope objective lens 10 in the first embodiment. The field curvature S in FIG. 2 is a field curvature in the sagittal direction, T is a field curvature in the meridian direction. FIG. 3 is a schematic diagram showing the lateral color of light with wavelengths of 500 nm, 588 nm, 685 nm, 770 nm and 830 nm after passing through the microscope objective lens 10 in the first embodiment. FIG. 4 is a schematic diagram showing the longitudinal aberration of light with wavelengths of 500 nm, 588 nm, 685 nm, 770 nm and 830 nm after passing through the microscope objective lens 10 of the first embodiment.

As shown in Table 5, the first embodiment satisfies all relationship formulas.

In this embodiment, the pupil entering diameter (ENPD) of the microscope objective lens 10 is 15.202 mm, the full field-of-view (1.0H) image-height IH is 0.65 mm, the working distance (WD) is 1.38 mm, and the numerical aperture (NA) is 0.85. The microscope objective lens 10 can control the trend of light between lenses, which helps to smoothly transition the outgoing light. The lens structure is compact, and the total length of the microscope objective lens 10 is controlled while ensuring that the imaging range reaches the expected state. The microscope objective lens 10 has a large numerical aperture to ensure that the light has sufficient convergence and has excellent optical performance, meeting the design requirements of low distortion, 20 times magnification, and long working distance.

Second Embodiment

Figure 5:
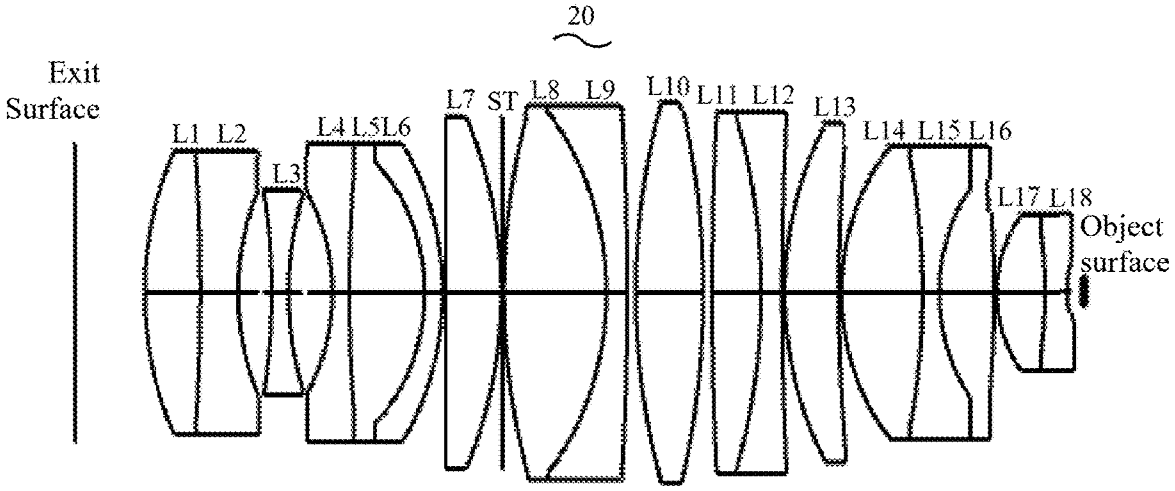
FIG. 5 is a schematic structural diagram of the microscope objective lens in a second embodiment of the present disclosure.

FIG. 5 is a schematic structural diagram of the microscope objective lens 20 in the second embodiment. The second embodiment is basically the same as the first embodiment, and the meaning of the symbols in the second embodiment is the same as the first embodiment. Only the differences are listed below.

Table 2 shows the design data of the microscope objective lens 20 in the second embodiment of the present disclosure.

TABLE 2

| | R | | D | | nd | | vd |
|---|---|---|---|---|---|---|---|
| R1 | 16.611 | d1= | 4.045 | nd1 | 1.8830 | vd1 | 40.800 |
| R2 | −92.374 | d2= | 0.000 | | | | |
| R3 | −92.374 | d3= | 2.712 | nd2 | 1.5928 | vd2 | 68.630 |
| R4 | 12.962 | d4= | 2.426 | | | | |
| R5 | −29.905 | d5= | 1.200 | nd3 | 1.6200 | vd3 | 63.880 |
| R6 | 16.127 | d6= | 3.149 | | | | |
| R7 | −10.148 | d7= | 1.200 | nd4 | 1.5688 | vd4 | 56.040 |
| R8 | 68.423 | d8= | 0.000 | | | | |
| R9 | 68.423 | d9= | 5.422 | nd5 | 1.4370 | vd5 | 95.100 |
| R10 | −9.872 | d10= | 0.000 | | | | |
| R11 | −9.872 | d11= | 1.300 | nd6 | 1.7620 | vd6 | 40.100 |
| R12 | −14.383 | d12= | 0.200 | | | | |
| R13 | 916.652 | d13= | 4.047 | nd7 | 1.5503 | vd7 | 75.500 |
| R14 | −21.919 | d141= | 0.100 | | | | |
| ST | ∞ | d142= | 0.100 | / | / | / | / |
| R15 | 33.159 | d15= | 7.352 | nd8 | 1.4370 | vg8 | 95.100 |
| R16 | −15.194 | d16= | 0.000 | | | | |
| R17 | −15.194 | d17= | 1.500 | nd9 | 1.6400 | vg9 | 60.080 |
| R18 | −149.064 | d18= | 0.613 | | | | |
| R19 | 33.847 | d19= | 4.851 | nd10 | 1.4370 | vg10 | 95.100 |
| R20 | −40.018 | d20= | 0.635 | | | | |
| R21 | 158.409 | d21= | 3.564 | nd11 | 1.4370 | vg11 | 95.100 |
| R22 | −30.460 | d22= | 0.000 | | | | |
| R23 | −30.460 | d23= | 1.500 | nd12 | 1.8040 | vg12 | 46.580 |
| R24 | 160.508 | d24= | 0.200 | | | | |
| R25 | 17.876 | d25= | 3.885 | nd13 | 1.4970 | vg13 | 81.610 |
| R26 | 86.566 | d26= | 0.200 | | | | |
| R27 | 12.508 | d27= | 5.816 | nd14 | 1.5503 | vg14 | 75.500 |
| R28 | −34.013 | d28= | 0.000 | | | | |
| R29 | −34.013 | d29= | 1.200 | nd15 | 1.7859 | vg15 | 44.200 |
| R30 | 9.413 | d30= | 0.000 | | | | |
| R31 | 9.413 | d31= | 3.938 | nd16 | 1.4970 | vg16 | 81.610 |
| R32 | −59.174 | d32= | 0.200 | | | | |
| R33 | 6.750 | d33= | 3.488 | nd17 | 1.9004 | vg17 | 37.370 |
| R34 | −22.463 | d34= | 0.000 | | | | |
| R35 | −22.463 | d35= | 1.805 | nd18 | 1.8042 | vg18 | 46.500 |
| R36 | 5.300 | d36= | 1.000 | | | | |
| Object side | ∞ | / | / | / | / | / | / |

In addition, in the subsequent Table 5, the values corresponding to the parameters specified in the relationship formulas in the second embodiment are also listed.

Figure 6:
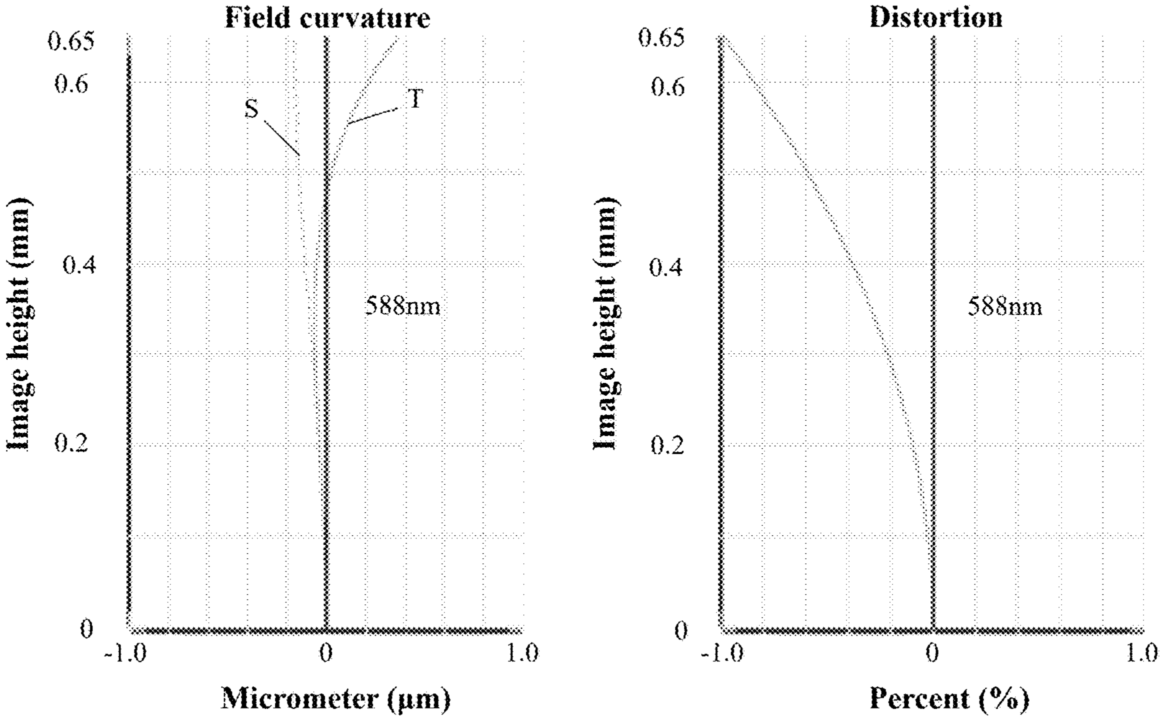
FIG. 6 is a schematic diagram of the field curvature and distortion of the microscope objective lens shown in FIG. 5.
Figure 7:
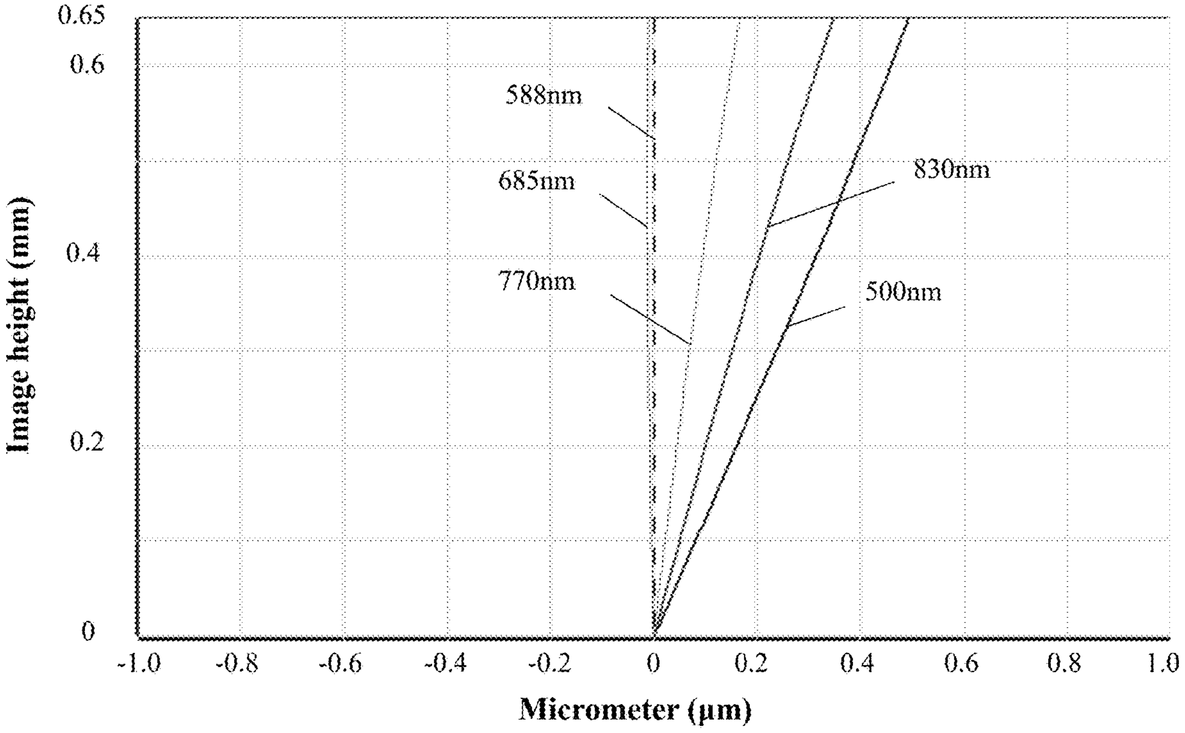
FIG. 7 is a schematic diagram of the lateral color of the microscope objective lens shown in FIG. 5.
Figure 8:
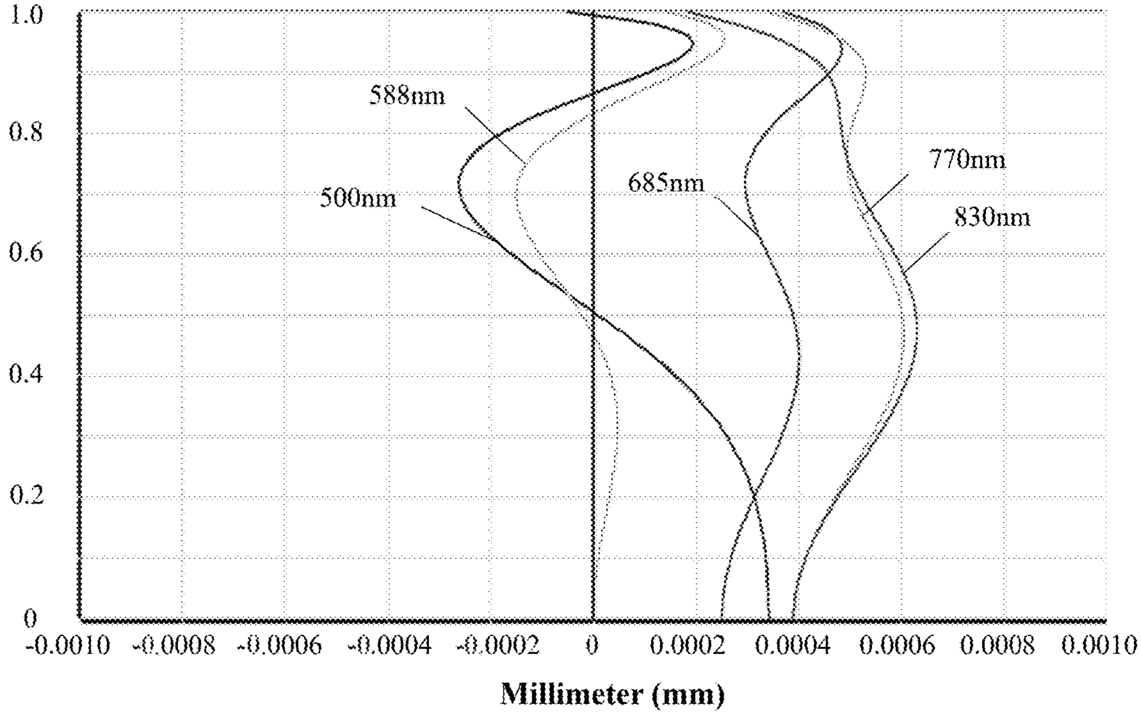
FIG. 8 is a schematic diagram of the longitudinal aberration of the microscope objective lens shown in FIG. 5.

FIG. 6 shows a schematic diagram of the field curvature and distortion of light with a wavelength of 588 nm after passing through the microscope objective lens 20 of the second embodiment. The field curvature S in FIG. 6 is a field curvature in the sagittal direction, T is a field curvature in the meridian direction. FIG. 7 shows a schematic diagram of the lateral color of light with wavelengths of 500 nm, 588 nm, 685 nm, 770 nm and 830 nm after passing through the microscope objective lens 20 of the second embodiment. FIG. 8 shows a schematic diagram of the longitudinal aberration of light with wavelengths of 500 nm, 588 nm, 685 nm, 770 nm and 830 nm after passing through the microscope objective lens 20 of the second embodiment.

As shown in Table 5, the second embodiment satisfies all relationship formulas.

In this embodiment, the pupil entering diameter (ENPD) of the microscope objective lens 20 is 15.211 mm, the full field-of-view (1.0H) image-height IH is 0.65 mm, the working distance WD is 1.30 mm, and the numerical aperture NA is 0.85. The microscope objective lens 20 can control the trend of light between lenses, which helps to smoothly transition the outgoing light. The lens structure is compact, and the total length of the microscope objective lens 20 is controlled while ensuring that the imaging range reaches the expected state. The microscope objective lens 20 has a large numerical aperture to ensure that the light has sufficient convergence and has excellent optical performance, meeting the design requirements of low distortion, 20 times magnification, and long working distance.

Third Embodiment

Figure 9:
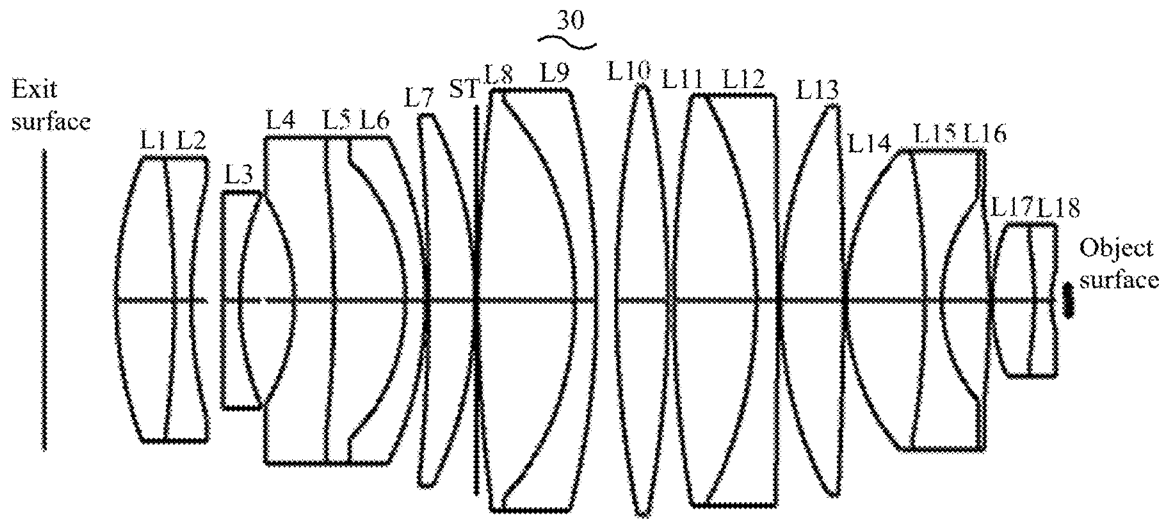
FIG. 9 is a schematic structural diagram of the microscope objective lens in a third embodiment of the present disclosure.

FIG. 9 is a schematic structural diagram of the microscope objective lens 30 in the third embodiment. The third embodiment is basically the same as the first embodiment, and the meaning of the symbols in the third embodiment is the same as the first embodiment. Only the differences are listed below.

In this embodiment, the exit-side surface of the third lens L3 is convex in a paraxial region.

The object-side surface of the fourth lens L4 is convex in a paraxial region.

The exit-side surface of the fifth lens L5 is concave in a paraxial region.

The exit-side surface of the seventh lens L7 is concave in a paraxial region.

The object-side surface of the twelfth lens L12 is convex in a paraxial region.

The object-side surface of the thirteenth lens L13 is convex in a paraxial region.

Table 3 shows the design data of the microscope objective lens 30 in the third embodiment of the present disclosure.

TABLE 3

| | R | | D | | nd | | vd |
|---|---|---|---|---|---|---|---|
| R1 | 18.504 | d1= | 4.100 | nd1 | 1.9004 | vd1 | 37.370 |
| R2 | −47.412 | d2= | 0.000 | | | | |
| R3 | −47.412 | d3= | 1.200 | nd2 | 1.6385 | vd2 | 55.450 |
| R4 | 21.638 | d4= | 2.200 | | | | |
| R5 | 603.951 | d5= | 1.200 | nd3 | 1.6968 | vd3 | 55.460 |
| R6 | 12.836 | d6= | 3.800 | | | | |
| R7 | −9.631 | d7= | 2.776 | nd4 | 1.6385 | vd4 | 55.450 |
| R8 | −51.753 | d8= | 0.000 | | | | |
| R9 | −51.753 | d9= | 5.000 | nd5 | 1.4370 | vd5 | 95.100 |
| R10 | −9.839 | d10= | 0.000 | | | | |
| R11 | −9.839 | d11= | 1.416 | nd6 | / | vd6 | / |
| R12 | −17.600 | d12= | 0.200 | | | | |
| R13 | −80.346 | d13= | 3.300 | nd7 | 1.5928 | vd7 | 68.630 |
| R14 | −22.000 | d141= | 0.100 | | | | |
| ST | ∞ | d142= | 0.100 | / | / | / | / |
| R15 | 70.631 | d15= | 6.800 | nd8 | 1.4370 | vg8 | 95.100 |
| R16 | −15.225 | d16= | 0.000 | | | | |
| R17 | −15.225 | d17= | 1.500 | nd9 | 1.5688 | vg9 | 56.040 |
| R18 | −38.804 | d18= | 1.393 | | | | |
| R19 | 50.755 | d19= | 3.600 | nd10 | 1.4370 | vg10 | 95.100 |
| R20 | −53.661 | d20= | 0.416 | | | | |
| R21 | 54.397 | d21= | 5.800 | nd11 | 1.4970 | vg11 | 81.610 |
| R22 | −20.622 | d22= | 0.000 | | | | |
| R23 | −20.622 | d23= | 1.500 | nd12 | 1.7859 | vg12 | 43.930 |
| R24 | −468.326 | d24= | 0.200 | | | | |
| R25 | 19.831 | d25= | 4.400 | nd13 | 1.5928 | vg13 | 68.630 |
| R26 | −169.805 | d26= | 0.200 | | | | |
| R27 | 11.351 | d27= | 5.500 | nd14 | 1.4970 | vg14 | 81.610 |
| R28 | −37.098 | d28= | 0.000 | | | | |
| R29 | −37.098 | d29= | 1.200 | nd15 | 1.7725 | vg15 | 49.620 |
| R30 | 7.702 | d30= | 0.000 | | | | |
| R31 | 7.702 | d31= | 3.300 | nd16 | 1.4970 | vg16 | 81.610 |
| R32 | −47.405 | d32= | 0.200 | | | | |
| R33 | 9.564 | d33= | 3.000 | nd17 | 1.9004 | vg17 | 37.370 |
| R34 | −17.092 | d34= | 0.000 | | | | |
| R35 | −17.092 | d35= | 1.200 | nd18 | 1.6968 | vg18 | 55.460 |
| R36 | 5.300 | d36= | 1.000 | | | | |

TABLE 3-continued

| | R | | D | | nd | | vd |
|---|---|---|---|---|---|---|---|
| Object side | ∞ | / | / | / | / | / | / |

In addition, the subsequent Table 5 also lists the values corresponding to the parameters specified in the relationship formulas in the third embodiment of the present disclosure.

Figure 10:
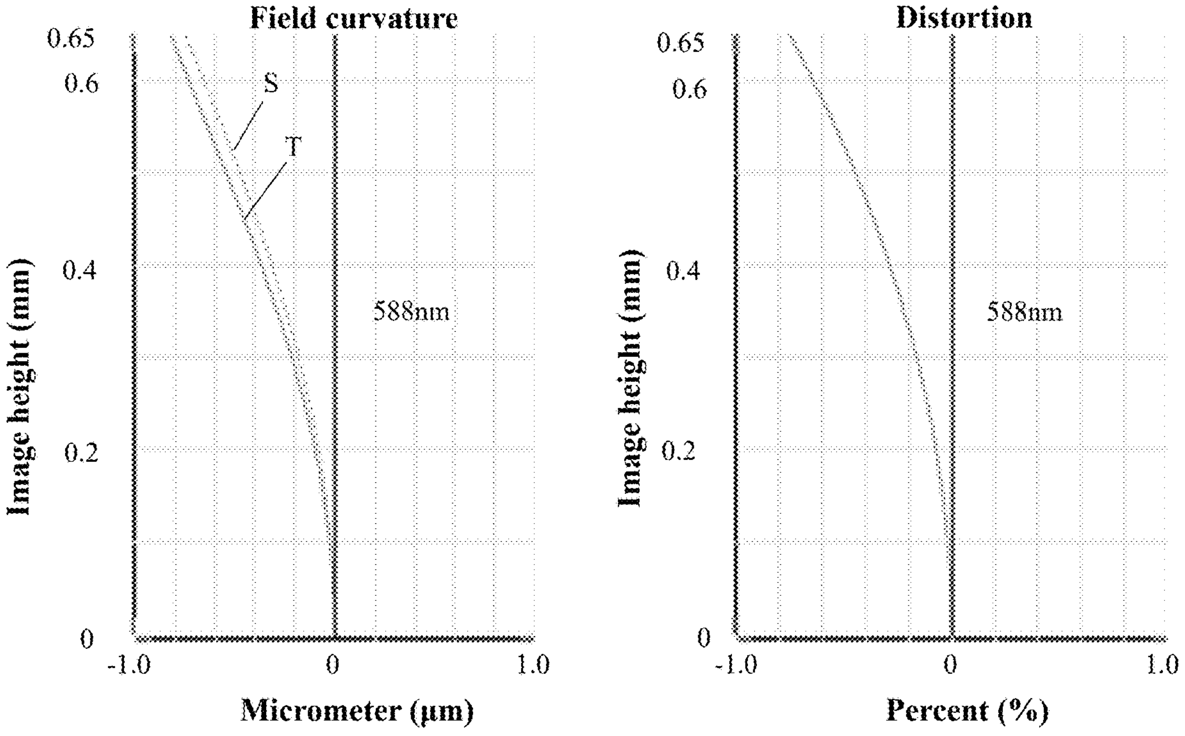
FIG. 10 is a schematic diagram of the field curvature and distortion of the microscope objective lens shown in FIG. 9.
Figure 11:
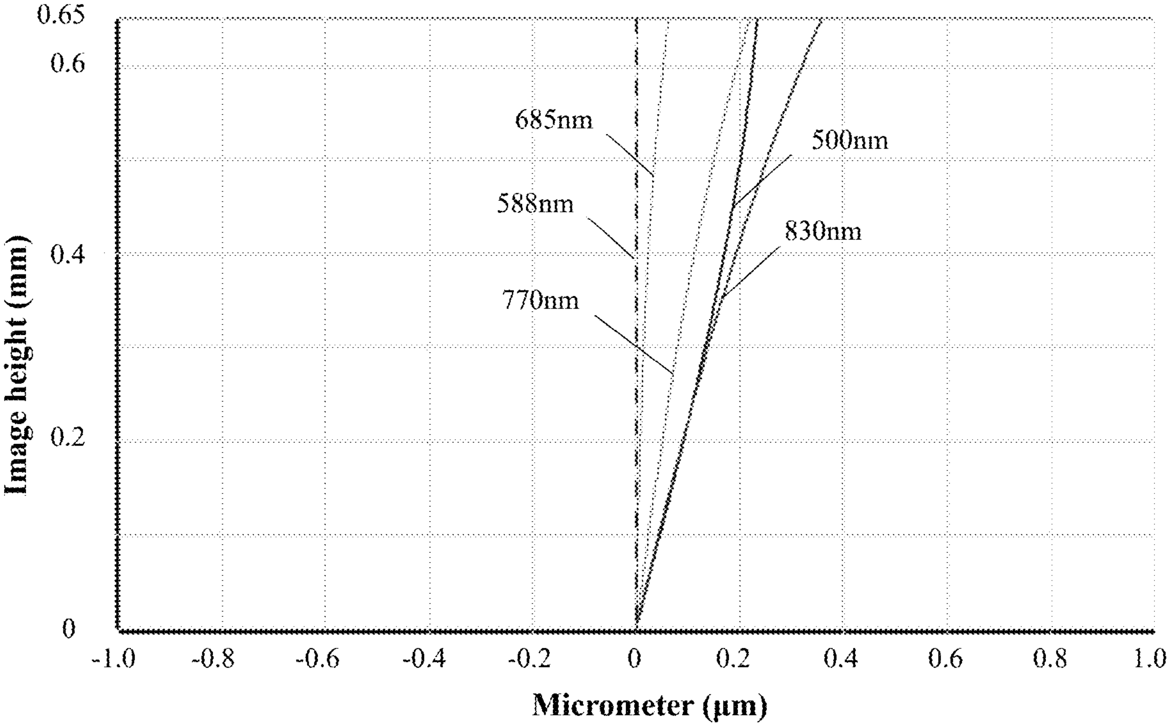
FIG. 11 is a schematic diagram of the lateral color of the microscope objective lens shown in FIG. 9.
Figure 12:
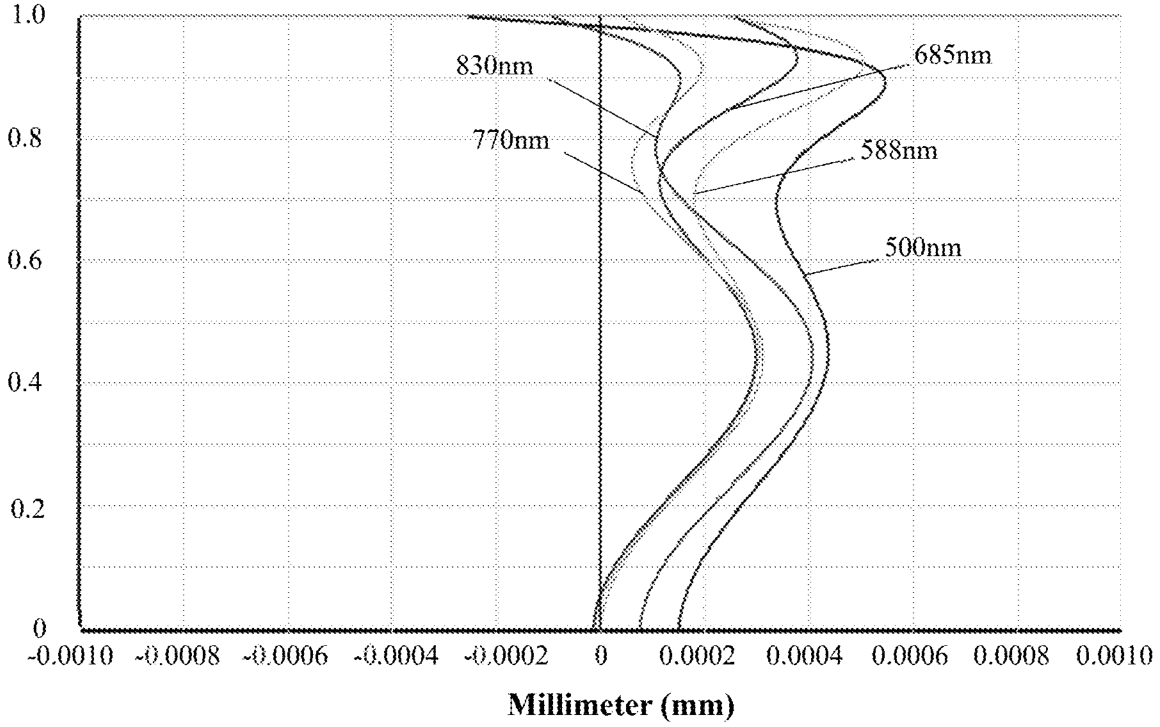
FIG. 12 is a schematic diagram of the longitudinal aberration of the microscope objective lens shown in FIG. 9.

FIG. 10 shows a schematic diagram of the field curvature and distortion of light with a wavelength of 588 nm after passing through the microscope objective lens 30 of the third embodiment. The field curvature S in FIG. 10 is a field curvature in the sagittal direction, T is a field curvature in the meridian direction. FIG. 11 shows a schematic diagram of the lateral color of light with wavelengths of 500 nm, 588 nm, 685 nm, 770 nm and 830 nm after passing through the microscope objective lens 30 of the third embodiment. FIG. 12 shows a schematic diagram of the longitudinal aberration of light with wavelengths of 500 nm, 588 nm, 685 nm, 770 nm and 830 nm after passing through the microscope objective lens 30 of the third embodiment.

As shown in Table 5, the third embodiment satisfies all relationship formulas.

In this embodiment, the pupil entering diameter (ENPD) of the microscope objective lens 30 is 15.301 mm, the full field-of-view (1.0H) image-height IH is 0.65 mm, the working distance WD is 1.30 mm, and the numerical aperture NA is 0.85. The microscope objective lens 30 can control the trend of light between lenses, which helps to smoothly transition the outgoing light. The lens structure is compact, and the total length of the microscope objective lens 30 is controlled while ensuring that the imaging range reaches the expected state. The microscope objective lens 30 has a large numerical aperture to ensure that the light has sufficient convergence and has excellent optical performance, meeting the design requirements of low distortion, 20 times magnification, and long working distance.

Fourth Embodiment

Figure 13:
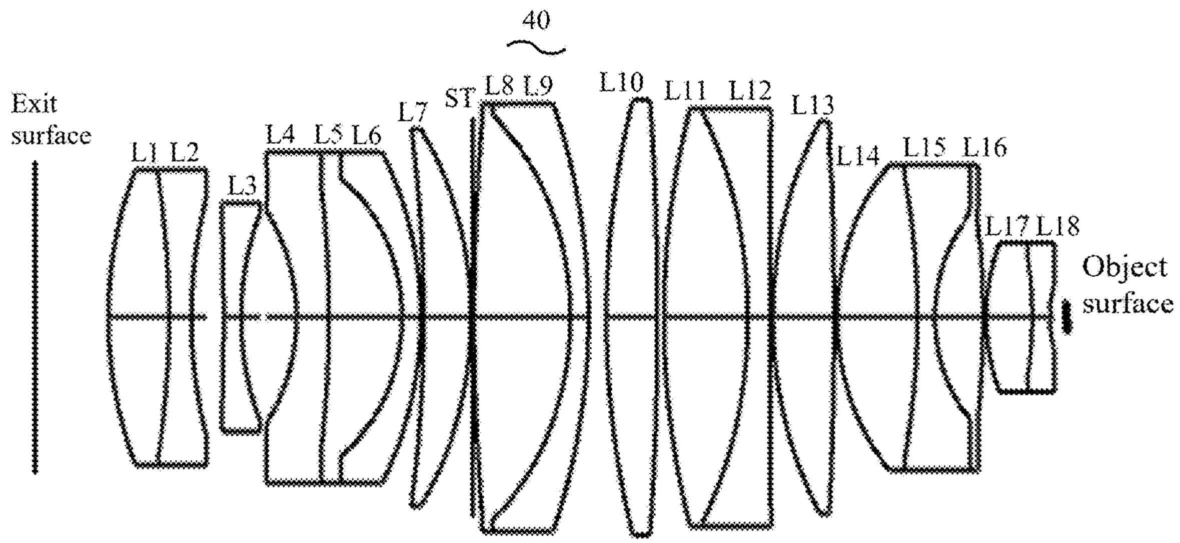
FIG. 13 is a schematic structural diagram of a microscope objective lens in a fourth embodiment of the present disclosure.

FIG. 13 is a schematic structural diagram of the microscope objective lens 40 in the fourth embodiment. The fourth embodiment is basically the same as the first embodiment, and the meaning of the symbols in the fourth embodiment is the same as the first embodiment. Only the differences are listed below.

In this embodiment, the object-side surface of the fourth lens L4 is convex in a paraxial region.

The exit-side surface of the fifth lens L5 is concave in a paraxial region.

The exit-side surface of the seventh lens L7 is concave in a paraxial region.

The object-side surface of the thirteenth lens L13 is convex in a paraxial region.

Table 4 shows the design data of the microscope objective lens 40 in the fourth embodiment of the present disclosure.

TABLE 4

| | R | | D | | nd | | vd |
|---|---|---|---|---|---|---|---|
| R1 | 18.931 | d1= | 4.200 | nd1 | 1.9004 | vd1 | 37.370 |
| R2 | −39.949 | d2= | 0.000 | | | | |
| R3 | −39.949 | d3= | 1.531 | nd2 | 1.6385 | vd2 | 55.450 |
| R4 | 21.914 | d4= | 2.200 | | | | |
| R5 | −136.847 | d5= | 1.200 | nd3 | 1.6968 | vd3 | 55.460 |

TABLE 4-continued

| | R | | D | | nd | | vd |
|---|---|---|---|---|---|---|---|
| R6 | 13.492 | d6= | 3.800 | | | | |
| R7 | −9.485 | d7= | 2.220 | nd4 | 1.6385 | vd4 | 55.450 |
| R8 | −50.000 | d8= | 0.000 | | | | |
| R9 | −50.000 | d9= | 5.000 | nd5 | 1.4370 | vd5 | 95.100 |
| R10 | −9.141 | d10= | 0.000 | | | | |
| R11 | −9.141 | d11= | 1.281 | nd6 | / | vd6 | / |
| R12 | −17.239 | d12= | 0.200 | | | | |
| R13 | −64.891 | d13= | 3.300 | nd7 | 1.5928 | vd7 | 68.630 |
| R14 | −17.374 | d141= | 0.100 | | | | |
| ST | ∞ | d142= | 0.100 | / | / | / | / |
| R15 | 110.222 | d15= | 6.600 | nd8 | 1.4370 | vg8 | 95.100 |
| R16 | −14.498 | d16= | 0.000 | | | | |
| R17 | −14.498 | d17= | 1.235 | nd9 | 1.5688 | vg9 | 56.040 |
| R18 | −30.200 | d18= | 1.220 | | | | |
| R19 | 41.182 | d19= | 3.500 | nd10 | 1.4370 | vg10 | 95.100 |
| R20 | −142.766 | d20= | 0.434 | | | | |
| R21 | 38.289 | d21= | 5.800 | nd11 | 1.4970 | vg11 | 81.610 |
| R22 | −22.113 | d22= | 0.000 | | | | |
| R23 | −22.113 | d23= | 1.500 | nd12 | 1.7859 | vg12 | 43.930 |
| R24 | 904.276 | d24= | 0.200 | | | | |
| R25 | 20.008 | d25= | 4.200 | nd13 | 1.5928 | vg13 | 68.630 |
| R26 | −179.458 | d26= | 0.200 | | | | |
| R27 | 11.774 | d27= | 5.500 | nd14 | 1.4970 | vg14 | 81.610 |
| R28 | −35.322 | d28= | 0.000 | | | | |
| R29 | −35.322 | d29= | 1.200 | nd15 | 1.7725 | vg15 | 49.620 |
| R30 | 7.938 | d30= | 0.000 | | | | |
| R31 | 7.938 | d31= | 3.300 | nd16 | 1.4970 | vg16 | 81.610 |
| R32 | −44.751 | d32= | 0.200 | | | | |
| R33 | 9.712 | d33= | 3.200 | nd17 | 1.9004 | vg17 | 37.370 |
| R34 | −16.496 | d34= | 0.000 | | | | |
| R35 | −16.496 | d35= | 1.200 | nd18 | 1.6968 | vg18 | 55.460 |
| R36 | 5.468 | d36= | 1.000 | | | | |
| Object side | ∞ | / | / | / | / | / | / |

In addition, the subsequent tables also list the values corresponding to the parameters specified in the relationship formulas for various parameters in the fourth embodiment.

Figure 14:
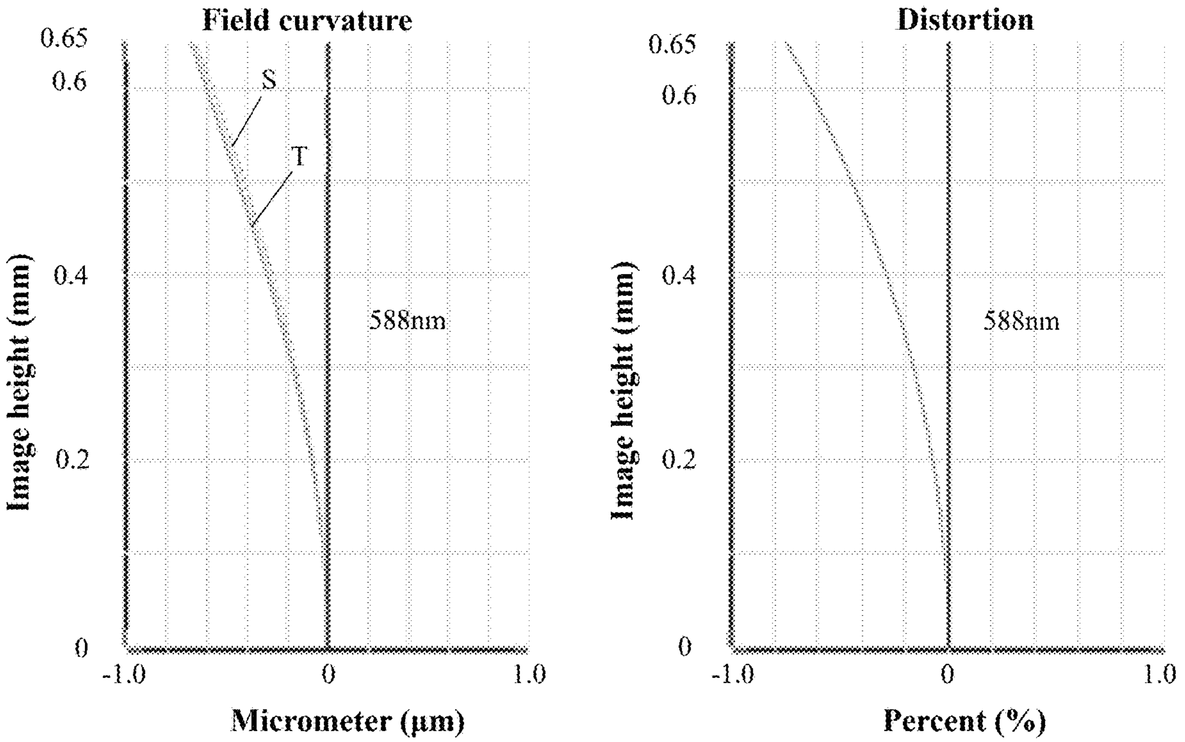
FIG. 14 is a schematic diagram of the field curvature and distortion of the microscope objective lens shown in FIG. 13.
Figure 15:
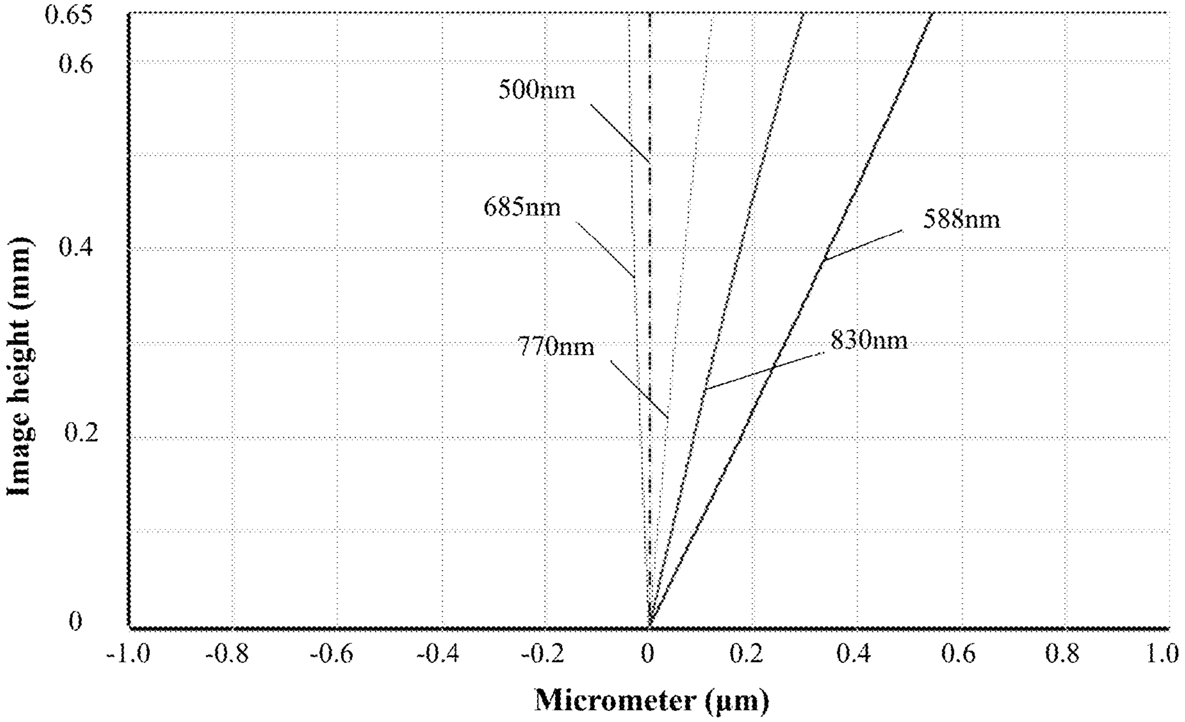
FIG. 15 is a schematic diagram of the lateral color of the microscope objective lens shown in FIG. 13.
Figure 16:
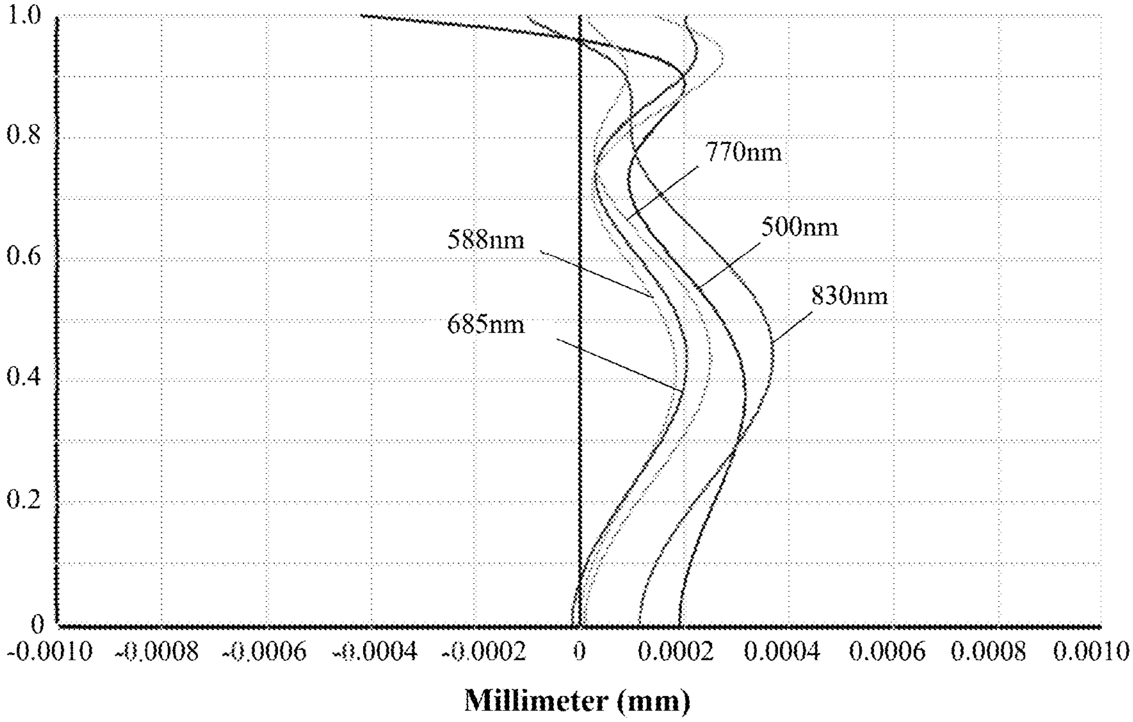
FIG. 16 is a schematic diagram of the longitudinal aberration of the microscope objective lens shown in FIG. 13.

FIG. 14 shows a schematic diagram of field curvature and distortion of light with a wavelength of 555 nm after passing through the microscope objective lens 40 of the fourth embodiment. The field curvature S in FIG. 14 is a field curvature in the sagittal direction, T is a field curvature in the meridian direction. FIG. 15 shows a schematic diagram of lateral color after wavelengths of 500 nm, 588 nm, 685 nm, 770 nm and 830 nm pass through the microscope objective lens 40 of the fourth embodiment. FIG. 16 shows a schematic diagram of the longitudinal aberration after wavelengths of 500 nm, 588 nm, 685 nm, 770 nm and 830 nm pass through the microscope objective lens 40 of the fourth embodiment.

As shown in Table 5, the fourth embodiment satisfies each relationship formula.

In this embodiment, the pupil entering diameter (ENPD) of the microscope objective lens 40 is 15.302 mm, the full field-of-view (1.0H) image-height IH is 0.65 mm, the working distance WD is 1.30 mm, and the numerical aperture NA is 0.85. The microscope objective lens 40 can control the trend of light between lenses, which helps to smoothly transition the outgoing light. The lens structure is compact, and the total length of the microscope objective lens 40 is controlled while ensuring that the imaging range reaches the expected state. The microscope objective lens 40 has a large numerical aperture to ensure that the light has sufficient convergence and has excellent optical performance, meeting the design requirements of low distortion, 20 times magnification, and long working distance.

Table 5 lists the numerical values corresponding to each relationship formula in the comparative examples according to the above conditions.

TABLE 5

| Parameters & relationship formulas | Embodiment 1 | Embodiment 2 | Embodiment 3 | Embodiment 4 |
|---|---|---|---|---|
| f1_2/f3 | −2.31 | −3.02 | −1.87 | −1.98 |
| f14_15_16/f | 3.41 | 5.12 | 6.62 | 6.91 |
| f17_18/(d33 + d35) | 99.65 | 4.41 | 116.13 | 46.63 |
| IH*f/TTL | 0.08 | 0.09 | 0.09 | 0.09 |
| R19/R20 | −1.529 | −0.846 | −0.946 | −0.288 |
| WD*NA | 1.175 | 1.105 | 1.105 | 1.108 |
| f | 9.000 | 9.000 | 9.000 | 9.000 |
| f1_2 | 39.074 | 50.540 | 35.273 | 34.711 |
| f3 | −16.895 | −16.733 | −18.837 | −17.568 |
| f4_5_6 | −31.388 | −34.655 | −20.645 | −19.069 |
| f7 | 43.020 | 38.959 | 44.022 | 39.014 |
| f8_9 | 505.648 | 211.840 | 83.036 | 73.511 |
| f10 | 43.144 | 42.817 | 60.321 | 73.566 |
| f11_12 | −137.899 | −70.321 | −363.385 | −3959.463 |
| f13 | 36.919 | 44.492 | 30.215 | 30.604 |
| f14_15_16 | 30.650 | 46.112 | 59.586 | 62.207 |
| f17_18 | 444.808 | 23.360 | 487.739 | 205.154 |
| FNO | 2.260 | 2.260 | 2.260 | 2.260 |
| IH | 0.650 | 0.650 | 0.650 | 0.650 |
| TTL | 69.950 | 67.950 | 66.900 | 65.925 |
| WD | 1.380 | 1.300 | 1.300 | 1.300 |
| NA | 0.850 | 0.850 | 0.850 | 0.850 |

The microscope objective lens provided in the embodiments of the present disclosure is introduced in detail above. The principle and implementations of the present disclosure are explained herein by examples. The description of the above embodiments is only used to help understand the idea of the present disclosure. There may be changes in the implementations and the scope of application. In summary, the content of this specification should not be understood as limiting the present disclosure.

What is claimed is:

1. A microscope objective lens, comprising: a first lens, a second lens, a third lens having negative refractive power, a fourth lens, a fifth lens, a sixth lens, a seventh lens having positive refractive power, an eighth lens, a ninth lens, a tenth lens having positive refractive power, an eleventh lens, a twelfth lens, a thirteenth lens having positive refractive power, a fourteenth lens, a fifteenth lens, a sixteenth lens, a seventeenth lens, and an eighteenth lens, which are arranged in sequence from an exit side to an object side;

wherein the microscope objective lens satisfies following relationships:

$$-3.10 \leq \mathrm{f1\_2}/f3 \leq -1.80;$$

$$3.40 \leq \mathrm{f14\_15\_16}/f \leq 7.00;$$

$$4.00 \leq f17\_18/(d33+d35) \leq 120.00; \text{ and}$$

$$0.08 \leq IH*f/TTL \leq 0.09;$$

wherein f represents a focal length of the microscope objective lens, f1_2 represents a combined focal length of the first lens and the second lens, f3 represents a focal length of the third lens, f14_15_16 represents a combined focal length of the fourteenth lens, the fifteenth lens and the sixteenth lens, f17_18 represents a combined focal length of the seventeenth lens and the eighteenth lens, d33 represents an on-axis thickness of the seventeenth lens, d35 represents an on-axis thickness of the eighteenth lens, TTL represents an on-axis distance from an object surface of the microscope objective lens to an exit surface of the first lens, and IH represents an image height of the microscope objective lens.

2. The microscope objective lens of claim 1, wherein the microscope objective lens further satisfies a following relationship:

$$-1.60 \leq R19/R20 \leq -2.50;$$

wherein R19 represents a curvature radius of an exit-side surface of the tenth lens, and R20 represents a curvature radius of an object-side surface of the tenth lens.

3. The microscope objective lens of claim 1, wherein the microscope objective lens further satisfies a following relationship:

$$WD*NA \geq 1.10;$$

wherein WD represents an on-axis distance from the object surface of the microscope objective lens to an object-side surface of the eighteenth lens, and NA represents a numerical aperture of the microscope objective lens.

4. The microscope objective lens of claim 1, wherein an exit-side surface of the first lens is convex in a paraxial region, and an object-side surface of the first lens is convex in a paraxial region;

wherein the microscope objective lens further satisfies following relationships:

$$-1.39 \leq (R1+R2)/(R1-R2) \leq -0.24; \text{ and}$$

$$0.03 \leq d1/TTL \leq 0.10;$$

wherein R1 represents a curvature radius of the exit-side surface of the first lens, R2 represents a curvature radius of the object-side surface of the first lens, and d1 represents an on-axis thickness of the first lens.

5. The microscope objective lens of claim 1, wherein an exit-side surface of the second lens is concave in a paraxial region, and an object-side surface of the second lens is concave in a paraxial region;

wherein the microscope objective lens further satisfies following relationships:

$$0.15 \leq (R3 + R4)/(R3 - R4) \leq 1.13; \text{ and}$$

$$0.01 \leq d3/TTL \leq 0.06;$$

wherein R3 represents a curvature radius of the exit-side surface of the second lens, R4 represents a curvature radius of the object-side surface of the second lens, and d3 represents an on-axis thickness of the second lens.

6. The microscope objective lens of claim 1, wherein an object-side surface of the first lens is glued to an exit-side surface of the second lens to form a combined lens with positive refractive power, and the microscope objective lens further satisfies a following relationship:

$$1.93 \leq f1\_2/f \leq 8.42.$$

7. The microscope objective lens of claim 1, wherein an object-side surface of the third lens is concave in a paraxial region;

wherein the microscope objective lens further satisfies following relationships:

$$0.15 \leq (R5 + R6)/(R5 - R6) \leq 1.57;$$

$$0.01 \leq d5/TTL \leq 0.03; \text{ and}$$

$$-4.19 \leq f3/f \leq -1.24;$$

wherein R5 represents a curvature radius of an exit-side surface of the third lens, R6 represents a curvature radius of an object-side surface of the third lens, and d5 represents an on-axis thickness of the third lens.

8. The microscope objective lens of claim 1, wherein an exit-side surface of the fourth lens is concave in a paraxial region;

wherein the microscope objective lens further satisfies following relationships:

$$-2.94 \leq (R7 + R8)/(R7 - R8) \leq -0.12; \text{ and}$$

$$0.01 \leq d7/TTL \leq 0.06;$$

Wherein R7 represents a curvature radius of the exit-side surface of the fourth lens, R8 represents a curvature radius of an object-side surface of the fourth lens, and d7 represents an on-axis thickness of the fourth lens.

9. The microscope objective lens of claim 1, wherein an object-side surface of the fifth lens is convex in a paraxial region;

wherein the microscope objective lens further satisfies following relationships:

$$0.11 \leq (R9 + R10)/(R9 - R10) \leq 2.20; \text{ and}$$

$$0.04 \leq d9/TTL \leq 0.15;$$

wherein R9 represents a curvature radius of an exit-side surface of the fifth lens, R10 represents a curvature radius of the object-side surface of the fifth lens, and d9 represents an on-axis thickness of the fifth lens.

10. The microscope objective lens of claim 1, wherein an exit-side surface of the sixth lens is concave in a paraxial region, and an object-side surface of the sixth lens is convex in a paraxial region;

wherein the microscope objective lens further satisfies following relationships:

$$-10.75 \leq (R11 + R12)/(R11 - R12) \leq -2.17; \text{ and}$$

$$0.01 \leq d11/TTL \leq 0.03;$$

wherein R11 represents a curvature radius of the exit-side surface of the sixth lens, R12 represents a curvature radius of the object-side surface of the sixth lens, and d11 represents an on-axis thickness of the sixth lens.

11. The microscope objective lens of claim 1, wherein an object-side surface of the fourth lens is glued to an exit-side surface of the fifth lens, and an object-side surface of the fifth lens is glued to an exit-side surface of the sixth lens to form a combined lens with negative refractive power;

wherein the microscope objective lens further satisfies a following relationship:

$$-7.70 \leq f4\_5\_6/f \leq -1.41;$$

wherein f4_5_6 represents a combined focal length of the fourth lens, the fifth lens and the sixth lens.

12. The microscope objective lens of claim 1, wherein an object-side surface of the seventh lens is convex in a paraxial region;

wherein the microscope objective lens further satisfies following relationships:

$$0.41 \leq (R13 + R14)/(R13 - R14) \leq 2.60;$$

$$0.02 \leq d13/TTL \leq 0.09; \text{ and}$$

$$2.16 \leq f7/f \leq 7.34;$$

wherein R13 represents a curvature radius of an exit-side surface of the seventh lens, R14 represents a curvature radius of the object-side surface of the seventh lens, d13 represents an on-axis thickness of the seventh lens, and f7 represents a focal length of the seventh lens.

13. The microscope objective lens of claim 1, wherein an exit-side surface of the eighth lens is convex in a paraxial region, and an object-side surface of the eighth lens is convex in a paraxial region;

wherein the microscope objective lens further satisfies following relationships:

$$0.19 \leq (R15+R16)/(R15-R16) \leq 1.15; \text{ and}$$

$$0.05 \leq d15/TTL \leq 0.16;$$

wherein R15 represents a curvature radius of the exit-side surface of the eighth lens, R16 represents a curvature radius of the object-side surface of the eighth lens, and d15 represents an on-axis thickness of the eighth lens.

14. The microscope objective lens of claim 1, an exit-side surface of the ninth lens is concave in a paraxial region, and an object-side surface of the ninth lens is convex in a paraxial region;

wherein the microscope objective lens further satisfies following relationships:

$$-5.69 \leq (R17+R18)/(R17-R18) \leq -0.82; \text{ and}$$

$$0.01 \leq d17/TTL \leq 0.04;$$

wherein R17 represents a curvature radius of the exit-side surface of the ninth lens, R18 represents a curvature radius of the object-side surface of the ninth lens, and d17 represents an on-axis thickness of the ninth lens.

15. The microscope objective lens of claim 1, wherein an object-side surface of the eighth lens is glued to an exit-side surface of the ninth lens to form a combined lens with positive refractive power;

wherein the microscope objective lens further satisfies a following relationship:

$$4.08 \leq f8\_9/f \leq 84.27;$$

wherein f8_9 represents a combined focal length of the eighth lens and the ninth lens.

16. The microscope objective lens of claim 1, wherein an exit-side surface of the tenth lens is convex in a paraxial region, and an object-side surface of the tenth lens is convex in a paraxial region;

wherein the microscope objective lens further satisfies following relationships:

$$-1.10 \leq (R19+R20)/(R19-R20) \leq 0.31;$$

$$0.03 \leq d19/TTL \leq 0.11; \text{ and}$$

$$2.38 \leq f10/f \leq 12.26;$$

wherein R19 represents a curvature radius of the exit-side surface of the tenth lens, R20 represents a curvature radius of the object-side surface of the tenth lens, d19 represents an on-axis thickness of the tenth lens, and f10 represents a focal length of the tenth lens.

17. The microscope objective lens of claim 1, wherein an exit-side surface of the eleventh lens is convex in a paraxial region, and an object-side surface of the eleventh lens is convex in a paraxial region;

wherein the microscope objective lens further satisfies following relationships:

$$0.02 \leq (R21+R22)/(R21-R22) \leq 1.02; \text{ and}$$

$$0.03 \leq d21/TTL \leq 0.13;$$

wherein R21 represents a curvature radius of the exit-side surface of the eleventh lens, R22 represents a curvature radius of the object-side surface of the eleventh lens, and d21 represents an on-axis thickness of the eleventh lens.

18. The microscope objective lens of claim 1, wherein an exit-side surface of the twelfth lens is concave in a paraxial region;

wherein the microscope objective lens further satisfies following relationships:

$$-2.18 \leq (R23+R24)/(R23-R24) \leq -0.29; \text{ and}$$

$$0.01 \leq d23/TTL \leq 0.04;$$

wherein R23 represents a curvature radius of the exit-side surface of the twelfth lens, R24 represents a curvature radius of the object-side surface of the twelfth lens, and d23 represents an on-axis thickness of the twelfth lens.

19. The microscope objective lens of claim 1, wherein an object-side surface of the eleventh lens is glued to an exit-side surface of the twelfth lens to form a combined lens with negative refractive power;

wherein the microscope objective lens further satisfies a following relationship:

$$-879.88 \leq f11\_12/f \leq -5.21;$$

wherein f11_12 represents a combined focal length of the eleventh lens and the twelfth lens.

20. The microscope objective lens of claim 1, wherein an exit-side surface of the thirteenth lens is convex in a paraxial region;

wherein the microscope objective lens further satisfies following relationships:

$$-3.04 \leq (R25+R26)/(R25-R26) \leq -0.53;$$

$$0.03 \leq d25/TTL \leq 0.10; \text{ and}$$

$$1.68 \leq f13/f \leq 7.42;$$

wherein R25 represents a curvature radius of the exit-side surface of the thirteenth lens, R26 represents a curvature radius of an object-side surface of the thirteenth lens, d25 represents an on-axis thickness of the thirteenth lens, and f13 represents a focal length of the thirteenth lens.

21. The microscope objective lens of claim 1, wherein an exit-side surface of the fourteenth lens is convex in a paraxial region, and an object-side surface of the fourteenth lens is convex in a paraxial region;

wherein the microscope objective lens further satisfies following relationships:

$$-1.06 \le (R27+R28)/(R27-R28) \le -0.27; \text{ and}$$

$$0.04 \le d27/TTL \le 0.13;$$

wherein R27 represents a curvature radius of the exit-side surface of the fourteenth lens, R28 represents a curvature radius of the object-side surface of the fourteenth lens, and d27 represents an on-axis thickness of the fourteenth lens.

22. The microscope objective lens of claim 1, wherein an exit-side surface of the fifteenth lens is concave in a paraxial region, and an object-side surface of the fifteenth lens is concave in a paraxial region;

wherein the microscope objective lens further satisfies following relationships:

$$-0.05 \le (R29+R30)/(R29-R30) \le 0.98; \text{ and}$$

$$0.01 \le d29/TTL \le 0.03;$$

wherein R29 represents a curvature radius of the exit-side surface of the fifteenth lens, R30 represents a curvature radius of the object-side surface of the fifteenth lens, and d29 represents an on-axis thickness of the fifteenth lens.

23. The microscope objective lens of claim 1, wherein an exit-side surface of the sixteenth lens is convex in a paraxial region, and an object-side surface of the sixteenth lens is convex in a paraxial region;

wherein the microscope objective lens further satisfies following relationships:

$$-1.45 \le (R31+R32)/(R31-R32) \le -0.29; \text{ and}$$

$$0.02 \le d31/TTL \le 0.09;$$

wherein R31 represents a curvature radius of the exit-side surface of the sixteenth lens, R32 represents a curvature radius of the object-side surface of the sixteenth lens, and d31 represents an on-axis thickness of the sixteenth lens.

24. The microscope objective lens of claim 1, wherein an object-side surface of the fourteenth lens is glued to an exit-side surface of the fifteenth lens, and an object-side surface of the fifteenth lens is glued to an exit-side surface of the sixteenth lens, to form a combined lens with positive refractive power.

25. The microscope objective lens of claim 1, wherein an exit-side surface of the seventeenth lens is convex in a paraxial region, and an object-side surface of the seventeenth lens is convex in a paraxial region;

wherein the microscope objective lens further satisfies following relationships:

$$-1.08 \le (R33+R34)/(R33-R34) \le -0.17; \text{ and}$$

$$0.02 \le d33/TTL \le 0.08;$$

wherein R33 represents a curvature radius of the exit-side surface of the seventeenth lens, R34 represents a curvature radius of the object-side surface of the seventeenth lens, and d33 represents an on-axis thickness of the seventeenth lens.

26. The microscope objective lens of claim 1, wherein an exit-side surface of the eighteenth lens is concave in a paraxial region, and an object-side surface of the eighteenth lens is concave in a paraxial region;

wherein the microscope objective lens further satisfies following relationships:

$$0.25 \le (R35+R36)/(R35-R36) \le 0.93; \text{ and}$$

$$0.01 \le d35/TTL \le 0.04;$$

wherein R35 represents a curvature radius of the exit-side surface of the eighteenth lens, R36 represents a curvature radius of the object-side surface of the eighteenth lens, and d35 represents an on-axis thickness of the eighteenth lens.

27. The microscope objective lens of claim 1, wherein an object-side surface of the seventeenth lens is glued to an exit-side surface of the eighteenth lens, to form a combined lens with positive refractive power, and the microscope objective lens further satisfies a following relationship:

$$1.30 \le f17\_18/f \le 81.29.$$

* * * * *